United States Patent
Murata et al.

(10) Patent No.: US 11,698,556 B2
(45) Date of Patent: Jul. 11, 2023

(54) LIQUID CRYSTAL DISPLAY DEVICE

(71) Applicant: Sharp Display Technology Corporation, Kameyama (JP)

(72) Inventors: Koji Murata, Kameyama (JP); Kosuke Nagata, Kameyama (JP); Kazutoshi Kida, Kameyama (JP); Kazutaka Hanaoka, Kameyama (JP); Shinji Shimada, Kameyama (JP); Yasuhiro Haseba, Kameyama (JP)

(73) Assignee: SHARP DISPLAY TECHNOLOGY CORPORATION, Kameyama (JP)

(*) Notice: Subject to any disclaimer, the term of this patent is extended or adjusted under 35 U.S.C. 154(b) by 0 days.

(21) Appl. No.: 17/715,085

(22) Filed: Apr. 7, 2022

(65) Prior Publication Data

US 2022/0334438 A1 Oct. 20, 2022

(30) Foreign Application Priority Data

Apr. 14, 2021 (JP) ................. 2021-068507

(51) Int. Cl.
| | | |
|---|---|---|
| *G02F 1/1343* | (2006.01) | |
| *G02F 1/1362* | (2006.01) | |
| *G02F 1/13* | (2006.01) | |
| *G02F 1/1333* | (2006.01) | |
| *G06F 3/041* | (2006.01) | |
| *G06F 3/044* | (2006.01) | |

(52) U.S. Cl.
CPC ...... *G02F 1/134372* (2021.01); *G02F 1/1323* (2013.01); *G02F 1/13338* (2013.01); *G02F 1/133345* (2013.01); *G02F 1/134336* (2013.01); *G02F 1/134345* (2021.01); *G02F 1/136286* (2013.01); *G06F 3/0412* (2013.01); *G06F 3/0446* (2019.05)

(58) Field of Classification Search
CPC ......... G02F 1/134372; G02F 1/134345; G02F 1/1323; G02F 1/133345; G02F 1/13338; G02F 1/134336; G02F 1/136286
See application file for complete search history.

(56) References Cited

U.S. PATENT DOCUMENTS

| | | |
|---|---|---|
| 2017/0059898 A1 | 3/2017 | Su et al. |
| 2021/0124223 A1* | 4/2021 | Murata ............... G02F 1/137 |
| 2021/0149511 A1* | 5/2021 | Chung ............... G06F 3/0416 |
| 2022/0197067 A1* | 6/2022 | Murata ............... G02F 1/13439 |

* cited by examiner

*Primary Examiner* — Edward J Glick
*Assistant Examiner* — David Y Chung
(74) *Attorney, Agent, or Firm* — Keating & Bennett, LLP

(57) ABSTRACT

The liquid crystal display device includes a liquid crystal panel, the liquid crystal panel including sub-pixels and including an active matrix substrate and a counter substrate, the active matrix substrate including a gate line, a first electrode, and a second electrode, the counter substrate including a third electrode, each of the sub-pixels being provided with an optical opening, the third electrode including a linear electrode extending along the gate line, a distance between the linear electrode and the optical opening being less than D/4 and a width of the linear electrode being D/4 or less, wherein a distance between two optical openings adjacent in the direction perpendicular to the extending direction of the gate line is defined as D.

6 Claims, 32 Drawing Sheets

FIG.31

| ※13.4 inchUHD+,339ppi | | | Comparative Example 1 | Example 1 | Example 2 |
|---|---|---|---|---|---|
| Green<br>One pixel (front) | | | L/2=<br>11μm<br><br>L/2=<br>11μm | L=<br>5.5μm<br><br>L=<br>5.5μm | L=<br>2.75μm<br><br>L=<br>2.75μm |
| Counter substrate | Third electrode | | Linear electrodes (horizontal striped electrodes) included | | |
| Active matrix substrate | Second electrode | | 0V(=Vcom) | 0V(=Vcom) | 0V(=Vcom) |
| | First electrode | | 0 to 6V | 0 to 6V | 0 to 6V |
| Liquid crystal | | | Positive LC; Δn=0.1412, Δε=4.9 | | |
| Front mode efficiency[%] | | | 63% | 63% | 63% |
| Front contrast ratio | | | 1137 | 1144 | 1139 |
| Contrast ratio at polar angle 45° | | | 22 | 22 | 22 |
| CR viewing angles | | | (viewing angle plot) | (viewing angle plot) | (viewing angle plot) |

FIG.38

| | | Example 3 | Example 4 |
|---|---|---|---|
| Green Two pixels (front) | | L/2=11μm (top), L/2=11μm (bottom) | L=5.5μm (top), L=5.5μm (bottom) |
| Counter substrate | Third electrode | Horizontal striped electrodes included 6V | |
| Active matrix substrate | Second electrode | 0V(=Vcom) | 0V(=Vcom) |
| | First electrode | 0 to 6V | 0 to 6V |
| Liquid crystal | | Positive LC; Δn=0.1412, Δε=4.9 | |
| Front mode efficiency[%] | | 63% | 59% |
| Front contrast ratio | | 1159 | 1091 |
| Contrast ratio at polar angle 45° | | 40 | 34 |
| CR viewing angles | | 40, 1159 | 34, 1091 |

FIG.39

| | | Typical in-cell liquid crystal display device | Comparative Example 3 | Comparative Example 4 |
|---|---|---|---|---|
| Green Two pixels (front) | | | L/2=11μm, L=22μm, L/2=11μm | L/2=8.25μm, L=16.5μm (D*3/4), L/2=8.25μm |
| Counter substrate | Third electrode | No electrode | Horizontal striped electrodes included 6V | |
| Active matrix substrate | Second electrode | 0V(=Vcom) | 0V(=Vcom) | 0V(=Vcom) |
| | First electrode | 0 to 6V | 0 to 6V | 0 to 6V |
| Liquid crystal | | Positive LC; $\Delta n$=0.1412, $\Delta \varepsilon$=4.9 | | |
| Front mode efficiency [%] | | 63% | 59% | 61% |
| Front contrast ratio | | 1182 | 1038 | 1141 |
| Contrast ratio at polar angle 45° | | 1003 | 16 | 129 |
| CR viewing angles | | 1003 1182 | 16 1038 | 129 1141 |

LIQUID CRYSTAL DISPLAY DEVICE

CROSS-REFERENCE TO RELATED APPLICATIONS

The present application claims priority under 35 U.S.C. § 119 to Japanese Patent Application No. 2021-068507 filed on Apr. 14, 2021, the contents of which are incorporated herein by reference in their entirety.

BACKGROUND OF THE INVENTION

Field of the Invention

The present invention relates to liquid crystal display devices.

Description of Related Art

Liquid crystal display devices are display devices utilizing a liquid crystal composition to display images. In a typical display mode thereof, voltage is applied to a liquid crystal composition sealed between paired substrates such that the alignment of liquid crystal molecules in the liquid crystal composition is changed according to the applied voltage, whereby the amount of light passing through the paired substrates is controlled. Such liquid crystal display devices have advantageous features such as thin profile, light weight, and low power consumption, and are therefore used in a variety of fields.

Studies to enhance the viewing angle characteristics of liquid crystal display devices have been made such that the same image can be observed regardless of whether the viewing angle range is narrow or wide. Meanwhile, a display method considered in terms of privacy protection is one that allows observation of an image in a narrow viewing angle range but makes the image difficult to observe in a wide viewing angle range.

For example, US 2017/0059898 A discloses a liquid crystal display device including: a first substrate provided with a first electrode being a solid electrode and a first alignment film; a second substrate provided with a second electrode, a third electrode, and a second alignment film; and a liquid crystal layer, wherein liquid crystal molecules adjacent to the first alignment film are tilted at a first pre-tilt angle of 0° to 5°, liquid crystal molecules adjacent to the second alignment film are tilted at a second pre-tilt angle of 30° to 50°, and the liquid crystal display device is configured to provide display with a narrow viewing angle with no bias voltage applied to the first electrode and to provide display with a wide viewing angle with bias voltage applied to the first electrode.

BRIEF SUMMARY OF THE INVENTION

The liquid crystal display device disclosed in US 2017/0059898 A employs negative liquid crystals that align with a tilt angle at an initial state (with no voltage applied) and achieves a narrow viewing angle mode with no voltage applied. Voltage application to the first electrode being a solid electrode generates a vertical electric field. Thus, a wide viewing angle mode is achieved as a result of addition of transverse electric field driving to a homogeneous alignment state. Unfortunately, deposition of the first electrode being a solid electrode on the side with the first substrate always causes a vertical electric field to make it difficult to achieve a high contrast ratio in a wide viewing angle mode.

The present invention has been made in view of the art and aims to provide a liquid crystal display device capable of switching between a wide viewing angle mode and a narrow viewing angle mode, achieving a high contrast ratio in the wide viewing angle mode, increasing a contrast ratio in observation from the front direction while reducing a contrast ratio in observation from an oblique direction in the narrow viewing angle mode, and improving a touch function when having an in-cell touch panel.

(1) One embodiment of the present invention is directed to a liquid crystal display device including: a liquid crystal panel; and a control circuit, the liquid crystal panel including sub-pixels arranged in a matrix pattern in an in-plane direction and sequentially including an active matrix substrate, a liquid crystal layer containing liquid crystal molecules, and a counter substrate, the active matrix substrate including a first substrate, a gate line, a first electrode, and a second electrode, the first electrode and the second electrode being stacked with an insulating layer in between, the counter substrate including a second substrate and a third electrode, each of the sub-pixels being provided with an optical opening allowing light to pass through the liquid crystal panel, the third electrode not being superimposed with at least a portion of each of the optical opening in a plan view and including a linear electrode extending along the gate line, in a direction perpendicular to an extending direction of the gate line, a distance between the linear electrode and the optical opening being less than D/4 and a width of the linear electrode being D/4 or less, wherein a distance between two optical openings adjacent in the direction perpendicular to the extending direction of the gate line is defined as D, the control circuit being configured to switch between application of alternating voltage and application of constant voltage to the third electrode.

(2) One embodiment of the present invention is directed to a liquid crystal display device including: a liquid crystal panel; and a control circuit, the liquid crystal panel including sub-pixels arranged in a matrix pattern in an in-plane direction and sequentially including an active matrix substrate, a liquid crystal layer containing liquid crystal molecules, and a counter substrate, the active matrix substrate including a first substrate, a gate line, a first electrode, and a second electrode, the first electrode and the second electrode being stacked with an insulating layer in between, the counter substrate including a second substrate and a third electrode, the sub-pixels being provided with respective optical openings which allow light to pass through the liquid crystal panel and include a first optical opening and a second opening adjacent in a direction perpendicular to an extending direction of the gate line, the third electrode not being superimposed with at least a portion of each of the optical openings in a plan view and including a first linear electrode and a second liner electrode both extending along the gate line, in the direction perpendicular to the extending direction of the gate line, a distance between the first optical opening and the first linear electrode being less than D/4 and a distance between the second optical opening and the second linear electrode being less than D/4, wherein a distance between the first optical opening and the second optical opening in the direction perpendicular to the extending direction of the gate line is defined as D, the first linear electrode and the second linear electrode not being disposed between the first optical opening and the second optical opening, the control circuit being configured to switch between application of alternating voltage and application of constant voltage to the third electrode.

(3) In an embodiment of the present invention, the liquid crystal display device includes the structure (1) or (2), and in the third electrode, the linear electrode includes two linear electrodes that satisfy the following formula 1:

$$L \leq S/2 \quad \text{(formula 1)}$$

wherein L represents a width of each of the linear electrodes and S represents an interval between the two liner electrodes in a direction perpendicular to an extending direction of the gate line.

(4) In an embodiment of the present invention, the liquid crystal display device includes the structure (1), (2), or (3), the liquid crystal display device further includes an island electrode not being electrically connected to the linear electrode in a layer provided with the linear electrode, and the island electrode is not superimposed with at least a portion of each of the optical openings in a plan view.

(5) In an embodiment of the present invention, the liquid crystal display device includes the structure (1), (2), (3), or (4), and the active matrix substrate further includes a touch panel line on a side closer to the liquid crystal layer of the first substrate.

(6) In an embodiment of the present invention, the liquid crystal display device includes the structure (1), (2), (3), (4), or (5), the liquid crystal display device provides a first display mode that allows a first image to be observed in a narrow viewing angle range including a direction normal to the liquid crystal panel, and a second display mode that allows the first image to be observed in a wide viewing angle range including the narrow viewing angle range, and the control circuit applies alternating voltage to the third electrode in the first display mode and applies constant voltage, which is common to the first electrode or the second electrode, to the third electrode in the second display mode.

(7) In an embodiment of the present invention, the liquid crystal display device includes the structure (6), the liquid crystal molecules align in a direction horizontal to the active matrix substrate in a non-voltage application state in which no voltage is applied to the liquid crystal layer, the liquid crystal molecules in the first display mode align at a different azimuth while forming an angle with the active matrix substrate under an influence of an electric field generated by the first electrode, the second electrode, and the third electrode, and the liquid crystal molecules in the second display mode align at a different azimuth while aligning parallel to the active matrix substrate under an influence of an electric field generated between the first electrode and the second electrode.

The present invention can provide a liquid crystal display device capable of switching between a wide viewing angle mode and a narrow viewing angle mode, achieving a high contrast ratio in the wide viewing angle mode, increasing a contrast ratio in observation from the front direction while reducing a contrast ratio in observation from an oblique direction in the narrow viewing angle mode, and improving a touch function when having an in-cell touch panel.

BRIEF DESCRIPTION OF THE DRAWINGS

FIG. 31 shows the evaluation results of the front mode efficiency, front contrast ratio, contrast ratio at a 45° polar angle, and contrast ratio viewing angles of each of the liquid crystal display devices of Examples 1 and 2 and Comparative Example 1.

FIG. 38 shows the evaluation results of the front mode efficiency, front contrast ratio, contrast ratio at a 45° polar angle, and contrast ratio viewing angles of each of the liquid crystal display devices of Examples 3 and 4.

FIG. 39 shows the evaluation results of the front mode efficiency, front contrast ratio, contrast ratio at a 45° polar angle, and contrast ratio viewing angles of each of the liquid crystal display devices of Comparative Examples 3 and 4 and a typical in-cell liquid crystal display device.

DETAILED DESCRIPTION OF THE INVENTION

Hereinafter, embodiments of the present invention are described. The present invention is not limited to the following embodiments, and the design of the present invention can be modified as appropriate within the range satisfying the configuration of the present invention. Hereinafter, like reference signs refer to the same portions or the portions having the same function throughout the drawings, and redundant description of already described portions is omitted as appropriate. The modes in the present invention may appropriately be combined within the gist of the present invention.

Figure 1:
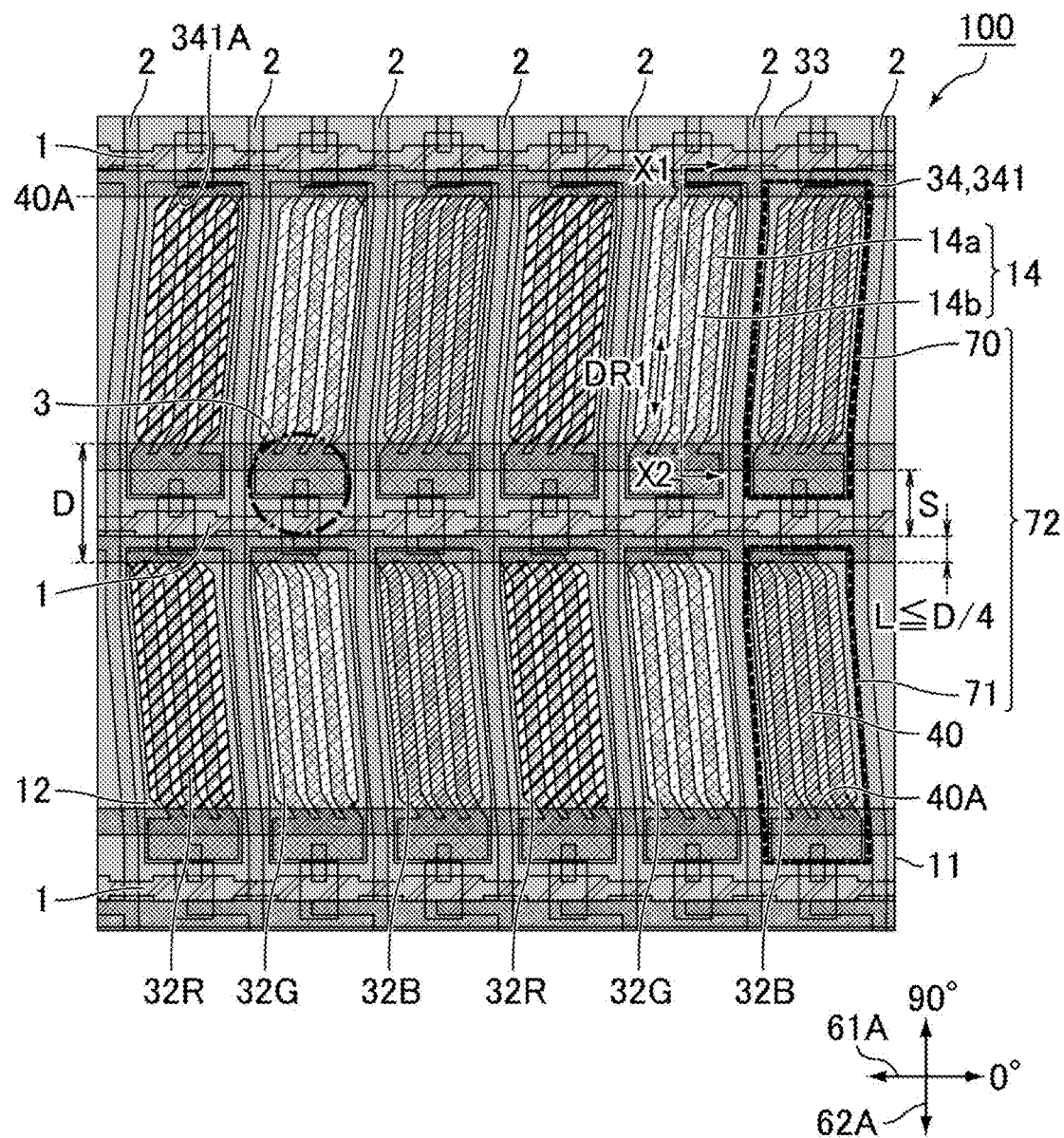
FIG. 1 is a schematic plan view of an example of a liquid crystal display device of Embodiment 1.
Figure 2:
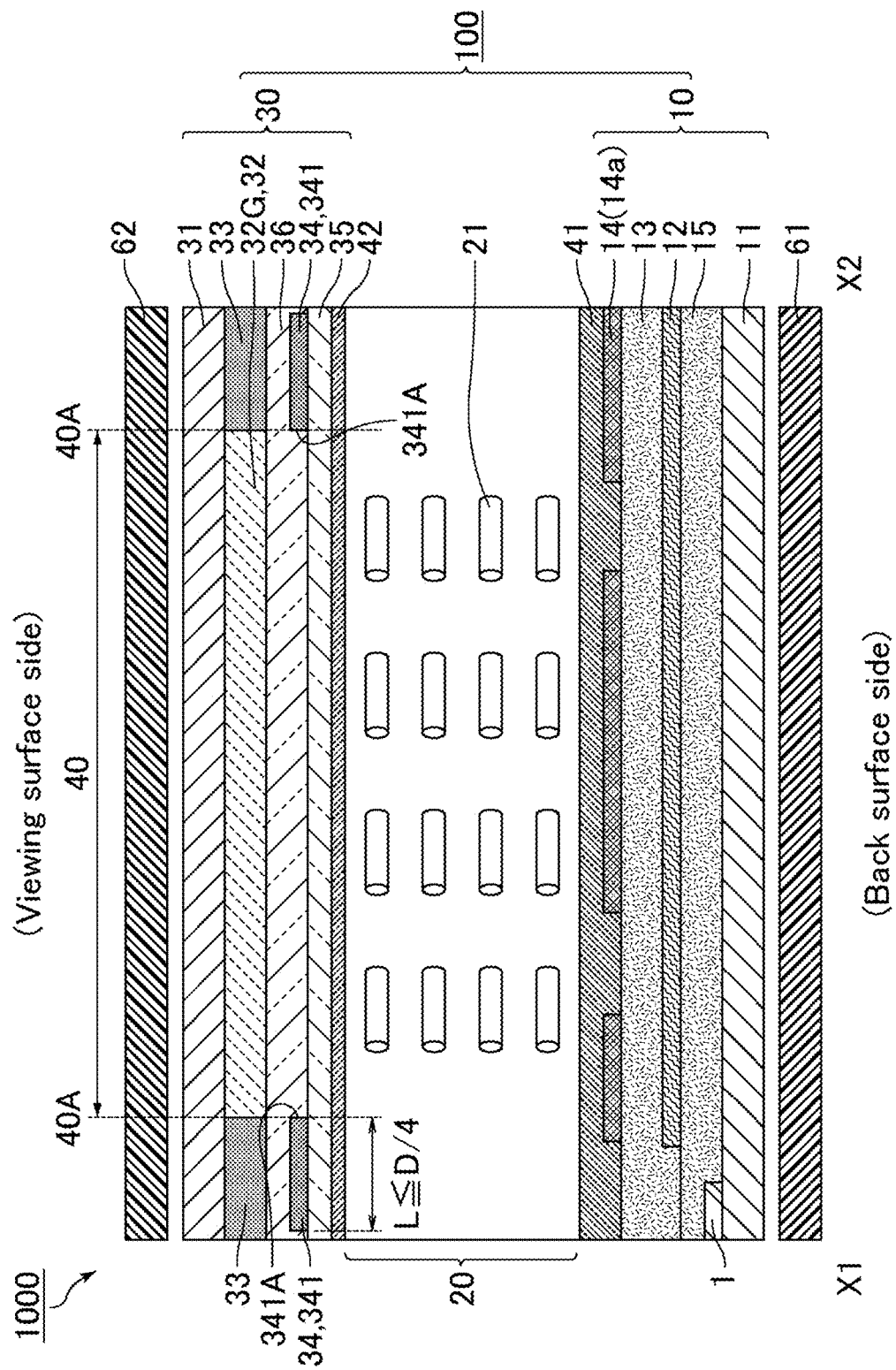
FIG. 2 is a schematic cross-sectional view taken along line X1-X2 in FIG. 1.
Figure 3:
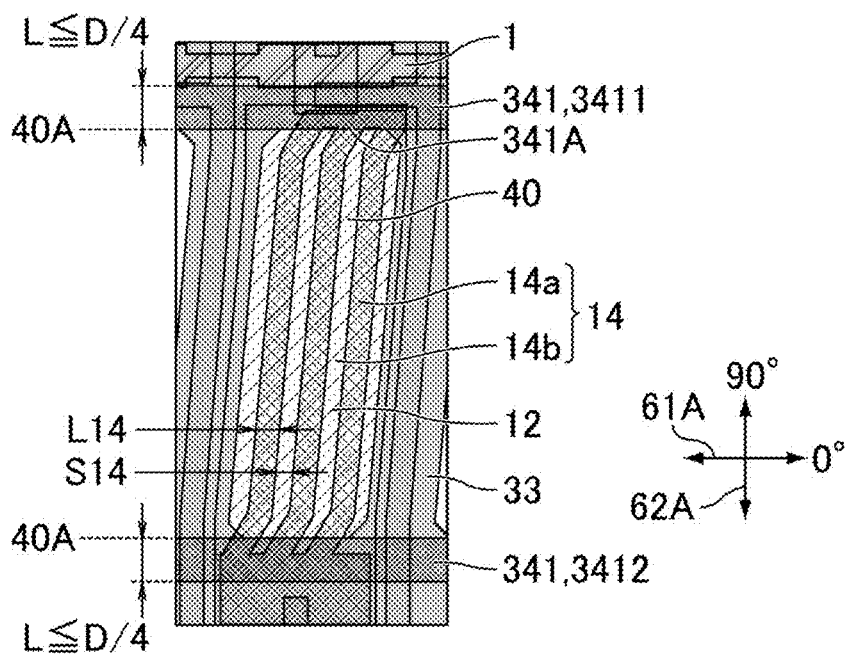
FIG. 3 is a schematic plan view showing arrangement of a first electrode, a second electrode, and a third electrode in one sub-pixel.

FIG. 1 is a schematic plan view of an example of a liquid crystal display device of Embodiment 1. FIG. 2 is a schematic cross-sectional view taken along line X1-X2 in FIG. 1. FIG. 3 is a schematic plan view showing arrangement of a first electrode, a second electrode, and a third electrode in one sub-pixel. As shown in FIG. 1 to FIG. 3, a liquid crystal display device 1000 of the present embodiment sequentially includes from the back surface side toward the viewing surface side a first polarizer 61, a liquid crystal panel 100, and a second polarizer 62. The liquid crystal panel 100 sequentially includes from the back surface side toward the viewing surface side an active matrix substrate 10, a first alignment film 41, a liquid crystal layer 20 containing liquid crystal molecules 21, a second alignment film 42, and a counter substrate 30. Herein, the side closer to the display screen of the liquid crystal display device 1000 is referred to as the "viewing surface side (front surface side)", and the side farther from the display screen is referred to as the "back surface side".

The liquid crystal panel 100 includes sub-pixels arranged in a matrix pattern in an in-plane direction. The active matrix substrate 10 includes, on the first substrate 11, gate lines 1 extending parallel to each other and source lines 2 extending parallel to each other in the direction crossing the gate lines 1, with an insulating film in between. The gate lines 1 and the source lines 2 are formed in a grid pattern as a whole. At each intersection between a gate line 1 and a source line 2 is arranged a thin-film transistor (TFT) 3 as a switching element.

The "sub-pixel" as used herein refers to a region surrounded by two adjacent gate lines 1 and two adjacent source lines 2 on the active matrix substrate 10 as shown in FIG. 1. In FIG. 1, a first sub-pixel 70 and a second sub-pixel 71 are adjacent in the column direction. The first sub-pixel 70 and the second sub-pixel 71 are each simply referred to as a "sub-pixel" when particular distinguishment therebetween is unnecessary.

As shown in FIG. 1, each sub-pixel is provided with an optical opening 40 that allows light to pass through the liquid crystal panel 100. In FIG. 1, the optical opening 40 is indicated by a portion surrounded by a dotted line. In the case where the liquid crystal panel 100 is a transmissive one, the optical opening 40 is a region that allows light emitted from the back surface of the liquid crystal panel 100 to travel toward the front surface of the liquid crystal panel 100. In the case where the liquid crystal panel 100 is a reflective one, the optical opening 40 is a region that allows incident light, which enters from the outside of the liquid crystal panel 100, and reflected light, which is the incident light emitted toward the outside of the liquid crystal panel 100 after being reflected inside the liquid crystal panel 100, to pass through the liquid crystal panel 100. The optical opening 40 may be superimposed with, for example, a transparent component such as a polarizer or a color filter in a plan view.

As shown in FIG. 2, the active matrix substrate 10 sequentially includes from the back surface side toward the viewing surface side the first substrate 11, a first electrode 12 disposed for each sub-pixel, a first insulating layer 13, and a second electrode 14 provided with linear electrode portions 14a. In other words, the active matrix substrate 10 has a fringe field switching (FFS) electrode structure in which the first electrode 12 and the second electrode 14 are stacked via the first insulating layer 13.

The present embodiment is described with reference to the liquid crystal display device 1000 having an FFS electrode structure as an example. The present embodiment can also be applied to an IPS electrode structure in which the first electrodes 12 and the second electrodes 14 are each a comb-teeth electrode and disposed in the same electrode layer with the teeth of the first electrodes 12 and the teeth of the second electrode 14 fit each other.

As shown in FIG. 2, the counter substrate 30 includes a second substrate 31 and a third electrode 34.

As shown in FIG. 1 to FIG. 3, the liquid crystal display device 1000 of the present embodiment includes the active matrix substrate 10 provided with the first electrodes 12 and the second electrodes 14 and the counter substrate 30 provided with the third electrode 34, and a control circuit switches between application of alternating voltage and application of constant voltage to the third electrode 34 to switch between a wide viewing angle mode and a narrow viewing angle mode.

As shown in FIG. 1 to FIG. 3, the third electrode 34 is not superimposed with at least a portion of each optical opening 40 in a plan view. With such a structure, a vertical electric field is less likely to affect liquid crystal molecules in the opening of each sub-pixel when an image is displayed in a wide viewing angle mode (public mode). Thus, a high transmittance and a high contrast ratio can be achieved.

Also, as shown in FIG. 1 to FIG. 3, the third electrode 34 includes linear electrodes 341 each extending along the gate lines 1, and the distance between a linear electrode 341 and an adjacent (closest) optical opening 40 in the direction perpendicular to the extending direction of the gate lines 1 is less than D/4, wherein the distance between the optical openings 40 in the direction perpendicular to the extending direction of the gate lines 1 is defined as D. Such a structure can effectively generate a tilted vertical electric field with respect to the liquid crystal layer 20, and thus can increase the contrast ratio in observation from the front direction in the narrow viewing angle mode while reducing the contrast ratio in observation from an oblique direction.

Also, as shown in FIG. 1 to FIG. 3, the width L of each linear electrode 341 in the direction perpendicular to the extending direction of the gate lines 1 is D/4 or less. Here, when an in-cell touch panel is mounted on the liquid crystal display device, a capacitance between a finger and a touch electrode can be acquired only from the openings of the third electrode. The structure of the present embodiment in which the width L of each linear electrode 341 in the direction perpendicular to the extending direction of the gate lines 1 is D/4 or less allows easier acquirement of a capacitance between a finger and a touch electrode than in the case of including linear electrodes with a wider width. As a result, a highly sensitive touch function is achieved even in the case of providing display in the narrow viewing angle mode (privacy mode).

Thus, the liquid crystal display device 1000 of the present embodiment simultaneously achieves switching to a privacy mode that provides a high front contrast ratio and the in-cell touch function. As shown in FIG. 1 to FIG. 3, a specific structure is that horizontally striped electrodes (linear electrodes 341) in the counter substrate 30 are thinned in the vicinity of the ends of the openings (optical openings 40) of a black matrix 33. Thereby, in the narrow viewing angle mode where a voltage of 6 V, for example, is applied to the horizontally striped electrodes, a highly sensitive in-cell touch function can be achieved while both of a high front contrast ratio and a low oblique contrast ratio are achieved. Hereinbelow, the liquid crystal display device 1000 of the present embodiment is described in more detail.

The active matrix substrate 10 is described. The first substrate 11 in the active matrix substrate 10 is not limited and may be a substrate formed from a resin such as polycarbonate or a glass substrate, for example.

The gate lines 1 and the source lines 2 may be formed from a metal material such as aluminum, copper, titanium, molybdenum, chromium, or an alloy of any of these metals, for example.

As shown in FIG. 1 to FIG. 3, the first electrode 12 and the second electrode 14 are both disposed for each sub-pixel. The first electrode 12 is preferably a planer electrode. The "planer electrode" herein means an electrode without any slit or opening at least in a region superimposed with the optical opening 40 of each sub-pixel in a plan view. Preferably, in a plan view, the first electrode 12 is superimposed with at least the linear electrode portions 14a of a corresponding second electrode 14 described later.

The second electrodes 14 are electrically connected to each other over the sub-pixels. Each second electrode 14 includes linear electrode portions 14a. The second electrode 14 has a planar shape in which the linear electrode portions 14a are closed at both ends as shown in FIG. 1, for example. The second electrode 14 may be provided with openings 14b surrounded by electrode portions. As shown in FIG. 1, the linear electrode portions 14a refer to portions extending in a certain direction (extending direction DR1). As shown in FIG. 1, the second electrode 14 may include electrode portions that are different from the linear electrode portions 14a and extend in a direction different from the extending direction DR1.

The extending direction DR1 of the linear electrode portions 14a may form an angle of 0° to 5° with an absorption axis 61A of the first polarizer 61 or an absorption axis 62A of the second polarizer 62. The linear electrode portions 14a may be disposed in the longitudinal direction of the sub-pixel.

As shown in FIG. 3, the electrode width L14 of one linear electrode portion 14a may be 2 μm or greater and 5 μm or smaller, and the distance (width of an opening) S14 between two adjacent linear electrode portions 14a may be 2 μm or greater and 5 μm or smaller.

For example, the second electrodes 14 disposed for the respective sub-pixels may be electrically connected to each other and may apply a common constant voltage to the sub-pixels, and the first electrodes 12 disposed for the respective sub-pixels may each be electrically connected to the corresponding source line 2 via the semiconductor layer of the corresponding TFT 3 and may apply different magnitudes of voltage to the sub-pixels in response to image signals. Alternatively, the second electrodes 14 may each be electrically connected to the corresponding source line 2 via the semiconductor layer of the corresponding TFT 3 and may apply magnitudes of voltage to the sub-pixels in response to image signals, and the first electrodes 12 may be electrically connected to each other and may apply a common constant voltage to the sub-pixels.

The first electrodes 12 and the second electrodes 14 may be formed from, for example, a transparent conductive material such as indium tin oxide (ITO) or indium zinc oxide (IZO).

The active matrix substrate 10 may sequentially include the gate lines 1 and a second insulating layer 15 on the side closer to the liquid crystal layer 20 of the first substrate 11, and the first electrodes 12 may be disposed on the second insulating layer 15.

Examples of the first insulating layer 13 and the second insulating layer 15 of the active matrix substrate 10 include inorganic insulating films and organic insulating films. Examples of the inorganic insulating films include inorganic films (relative dielectric constant ε=5 to 7) such as a film of silicon nitride (SiNx), a film of silicone oxide (SiO$_2$), and a multiplayer film of any of these. Examples of the organic insulating films include organic films such as a film of acryl resin, polyimide resin, or novolac resin and a stack of any of these.

Next, the counter substrate 30 is described. As shown in FIG. 2, the counter substrate 30 may include color filters 32 and the black matrix 33 between the second substrate 31 and the third electrode 34.

Examples of the second substrate 31 in the counter substrate 30 are the same as those for the first substrate 11. Examples of the third electrode 34 are the same as those for the first electrodes 12 and the second electrodes 14.

The linear electrodes 341 of the third electrode 34 are disposed along the gate lines 1 and the shape thereof is not limited. Examples of the shape of the linear electrodes 341 include linear, curved, and zig-zag shapes.

Preferably, the third electrode 34 includes linear electrodes 341 each superimposed with multiple sub-pixels in the shorter direction of each sub-pixel, and the linear electrodes 341 are electrically connected to each other. Such a structure allows application of common voltage to all the sub-pixels superimposed with the linear electrodes 341.

The distance between each linear electrode 341 and an adjacent optical opening 40 in the direction perpendicular to the extending direction of the gate lines 1 is less than D/4. Here, the distance between each linear electrode 341 and an adjacent optical opening 40 means that the distance between an end 341A of the linear electrode 341 and an end 40A of an adjacent (closest) optical opening 40 in the direction perpendicular to the extending direction of the gate lines 1. More specifically, when the linear electrode 341 is not superimposed with the optical opening 40, the distance between the linear electrode 341 and the optical opening 40 refers to the distance between the end 341A of the linear electrode 341 closest to the optical opening 40 and the end 40A of the optical opening 40 closest to the end 341A in the direction perpendicular to the extending direction of the gate lines 1. When the end 341A of the linear electrode 341 is superimposed with the end 40A of the optical opening 40, the distance between the linear electrode 341 and the optical opening 40 becomes zero. Herein, when the linear electrode 341 is superimposed with the optical opening 40, the distance between the linear electrode 341 and the optical opening 40 is also defined to be zero.

Preferably, each linear electrode 341 is superimposed with a gate line 1. Such a structure can increase the transmittance.

The linear electrode 341 may be or may not be superimposed with the optical opening 40. Preferably, the linear electrode 341 is not superimposed with the optical opening 40. Such a structure can increase the transmittance. Preferably, each linear electrode 341 is not superimposed with any optical opening 40, and the end 341A of the linear electrode 341 is superimposed with the end 40A of the optical opening 40. Such a structure allows the linear electrode 341 to be disposed closer to the optical opening 40 and thereby can effectively generate an oblique electric field in the thickness direction of the liquid crystal layer 20, and thus tends to provide a narrow viewing angle.

Preferably, the width L of each linear electrode 341 in the direction perpendicular to the extending direction of the gate lines 1 is D/8 or less. Such a structure can achieve a more highly sensitive touch function.

Preferably, the width L of each linear electrode 341 in the direction perpendicular to the extending direction of the gate lines 1 is D/20 or more. Such a structure can effectively generate an oblique electric field in the thickness direction of the liquid crystal layer 20 with voltage applied to the third electrode 34, and thus tends to provide a narrow viewing angle.

Preferably, the linear electrodes satisfy the following formula 1:

$$L \leq S/2 \quad \text{(formula 1)}$$

wherein L represents a width of each linear electrode 341 and S represents a width between two linear electrodes 3411 and 3412, in the direction perpendicular to the extending direction of the gate lines 1. Such a structure can achieve a more highly sensitive touch function when an in-cell touch panel is mounted on the liquid crystal display device 1000. For example, the touch signal proportion can be 65% or more. Here, the width S means the shortest distance between the linear electrodes 341 in the direction perpendicular to the extending direction of the gate lines 1.

The third electrode 34 can also be formed such that it is not superimposed with the optical openings 40 at all in a plan view. The third electrode 34 may be arranged around the optical openings 40 in a plan view or may extend from the outer edge of each optical opening 40 toward the inside of the optical opening 40 so as to be superimposed with a portion of the optical opening 40. The portions "around the optical openings 40" refer to regions between optical openings 40 adjacent in the row direction and the column direction of the liquid crystal panel 100. The third electrode 34 is not superimposed with at least a portion of each optical opening 40 in a plan view, and may be arranged to surround at least a portion of each of the optical openings 40 or may be arranged between optical openings 40 adjacent at least in the row direction or in the column direction.

As shown in FIG. 1 and FIG. 3, preferably, the third electrode 34 is not superimposed with the linear electrode portions 14a of the second electrodes 14 in a plan view. This structure can form not a vertical electric field but a tilted vertical electric field in the liquid crystal layer 20 in a region where the third electrode 34 is not superimposed with the linear electrode portions 14a, which is more preferred in providing an asymmetric viewing angle.

In a plan view, the third electrode 34 may be entirely light-shielded by the black matrix 33, or the third electrode 34 may be partly exposed through the optical openings 40. When the third electrode 34 is partly superimposed with the linear electrode portions 14a of the second electrodes 14 in the optical openings 40, the area where the third electrode 34 is superimposed with the linear electrode portions 14a in a plan view is preferably ⅕ or less, more preferably 1/10 or less of the area of the optical openings 40.

As shown in FIG. 1, the color filters 32 may be arranged in the respective sub-pixels such that the color filters 32 are superimposed with the optical openings 40 when the liquid crystal panel 100 is observed from the front surface side. The color filters 32 include, for example, red color filters 32R, green color filters 32G, and blue color filters 32B. For example, the color filters 32 may be formed such that color filters having the same color are arranged consecutively in the column direction or the row direction of the liquid crystal panel 100. Even in such an arrangement, the color filters 32 are arranged in the respective sub-pixels such that the color filters 32 are superimposed with the optical openings 40 since the black matrix 33 blocks light when the liquid crystal panel 100 is observed from the front surface side.

Examples of the material of the color filters 32 of the respective colors include photosensitive resins containing color materials such as dyes or pigments. Examples of the pigments include a single pigment and a mixture of one or more pigments. The dyes and the pigments may be those typically used in the field of color filters. A photosensitive resin is a polymer whose properties change upon exposure to light. The photosensitive resin may be one typically used in the field of color filters, such as photoresists. The photosensitive resin may be a negative photosensitive resin or a positive photosensitive resin. The color filters of the respective colors are each produced by forming a film of a photosensitive resin containing a color material such as a dye or a pigment by application and performing photolithography that includes exposure to light, development, and the like.

The black matrix 33 is not limited and may be a typical product used in the field of liquid crystal display devices. For example, a black matrix made of a black resin may be used. In a plan view, the black matrix 33 may be disposed around each optical opening 40 or may be disposed to define each optical opening 40. For example, the black matrix 33 may be formed from a black resin surrounding each optical opening 40 in a plan view, and the third electrode 34 may be superimposed with the black matrix 33.

As shown in FIG. 2, the counter substrate 30 preferably includes a dielectric layer (first dielectric layer 35) between the third electrode 34 and the second alignment film 42. The first dielectric layer 35 can prevent or reduce generation of a vertical electric field which undesirably acts in the thickness direction of the liquid crystal layer 20 in the wide viewing angle mode where no voltage is applied to the third electrode 34. As a result, the liquid crystal display device according to the embodiment functions as a transverse electric field mode liquid crystal display device that generates a fringe electric field which is similar to that generated in a typical FFS mode liquid crystal display device including no electrodes on the side with the counter substrate, and thus can achieve a better mode efficiency than the case without the first dielectric layer 35.

The first dielectric layer 35 may have a dielectric constant ε of 3 to 4, for example. The first dielectric layer 35 preferably has a thickness of 0.5 μm or greater and 4 μm or smaller, more preferably 2 μm or greater and 4 μm or smaller. The dielectric layer 35 having a thickness greater than 4 μm may cause parallax to lower the display quality. The first dielectric layer 35 may be formed from an acrylic resin or a polyimide resin, for example.

As shown in FIG. 2, the counter substrate 30 may include a second dielectric layer 36 between the color filters 32 and the third electrode 34. The second dielectric layer 36 can flatten the surfaces of the color filters 32 and reduce the occurrence of cracks during formation of the third electrode 34. The second dielectric layer 36 may have a dielectric constant s, thickness, and material similar to those of the first dielectric layer 35.

The liquid crystal layer 20 contains the liquid crystal molecules 21. The liquid crystal molecules 21 preferably have a positive anisotropy of dielectric constant (Δs) defined by the following formula (L) (positive type). Also, the liquid crystal molecules 21 preferably align homogeneously in the state where no voltage is applied (in the non-voltage application state). The direction in which the major axes of the liquid crystal molecules 21 are oriented in the non-voltage application state is also referred to as the initial alignment direction of the liquid crystal molecules.

$$\Delta\varepsilon=\text{(dielectric constant in liquid crystal molecule major axis direction)}-\text{(dielectric constant in liquid crystal molecule minor axis direction)} \quad (L)$$

The expression "with no voltage applied" means the state in which a voltage equal to or higher than the threshold value of the liquid crystal molecules is not applied to the liquid crystal layer 20. Examples thereof include the state in which the same constant voltage is applied to all of each first electrode 12, each second electrode 14, and the third electrode 34; and the state in which constant voltage is applied to at least one of the first electrode 12, the second electrode 14, or the third electrode 34 and a voltage lower than the threshold value of the liquid crystal molecules is applied to the other electrode(s), relative to the constant voltage.

The liquid crystal layer 20 may have a thickness of 2 μm to 5 μm. A liquid crystal layer 20 with a smaller thickness allows a faster response time of the liquid crystal molecules 21. In terms of production, the liquid crystal layer 20 more preferably has a thickness of 2.5 to 3.5 μm.

The liquid crystal layer 20 may have a retardation ($\Delta nd_1$) of 250 nm to 400 nm. The retardation ($\Delta nd_1$) is represented by the product of the birefringence index ($\Delta n$) of the liquid crystal material by the thickness ($d_1$) of the liquid crystal layer. In order to provide sufficient brightness, the retardation $\Delta nd_1$ is more preferably 280 to 350 nm.

The first alignment film 41 and the second alignment film 42 control the initial alignment azimuth of the liquid crystal molecules 21 with no voltage applied and the polar angle (pre-tilt angle) of the liquid crystal molecules 21 with no voltage applied. In terms of improving the viewing angle characteristics, the first alignment film 41 and the second alignment film 42 are each preferred to be an alignment film (horizontal alignment film) which aligns the liquid crystal molecules 21 parallel to a surface of the active matrix substrate 10 or a surface of the counter substrate 30.

The expression "aligns parallel to" means that the tilt angle (including the pre-tilt angle) of the liquid crystal molecules 21 is 0° to 5°, preferably 0° to 3°, more preferably 0° to 1° with respect to a reference surface. The tilt angle (including the pre-tilt angle) of the liquid crystal molecules 21 means the angle of the major axes of the liquid crystal molecules 21 with respect to a reference surface.

Preferably, the inclination azimuth (azimuth angle) of the liquid crystal molecules 21 with respect to the surface of the active matrix substrate 10 is different from the inclination azimuth of the liquid crystal molecules 21 with respect to the surface of the counter substrate 30 by 180°. For example, a preferred structure is that the liquid crystal molecules 21 are raised from the 90° azimuth toward the 270° azimuth with respect to the surface of one of the active matrix substrate 10 and the counter substrate 30, and the liquid crystal molecules 21 are raised from the 270° azimuth toward the 90° azimuth with respect to the other substrate. Attaching the first alignment film 41 formed on the surface of the active matrix substrate 10 and the second alignment film 42 formed on the surface of the counter substrate 30 with the directions of the alignment treatment on the films reversed (with the directions thereof differentiated by 180°) can make the inclination azimuth of the liquid crystal molecules 21 with respect to the surface of the active matrix substrate 10 be different from the inclination azimuth of the liquid crystal molecules 21 with respect to the surface of the counter substrate 30 by 180°.

Preferably, the first alignment film 41 or the second alignment film 42 has an anchoring energy of $1\times10^{-7}$ J/m$^2$ or less. An alignment film having an anchoring energy of $1\times10^{-7}$ J/m$^2$ or less is also referred to as a weak anchoring film, and an alignment film having an anchoring energy of more than $1\times10^{-7}$ J/m$^2$ is also referred to as a strong anchoring film. The anchoring energy of each alignment film is a value measured by a typical method such as the rotating magnetic field method.

Preferably, the first alignment film 41 has an anchoring energy of $1\times10^{-7}$ J/m$^2$ or less. Preferably, the first alignment film 41 is a weak anchoring film, and the second alignment film 42 is a strong anchoring film. As described above, the alignment azimuth of the liquid crystal molecules 21 in the liquid crystal layer 20 is changed by a fringe electric field formed between the first electrodes 12 and the second electrodes 14, but the liquid crystal molecules 21 are less likely to be influenced by the fringe electric field in a central portion of the linear electrode portions 14a of each second electrode 14 and a central portion of each opening 14b and thus are less likely to move. Use of an alignment film having an anchoring energy of $1 \times 10^{-7}$ J/m$^2$ or less as the first alignment film 41 on side with the active matrix substrate 10 allows easier moving of liquid crystal molecules in portions under a smaller influence of the fringe electric field (e.g., electrode central portion of each second electrode 14 and central portion between adjacent second electrodes 14). As a result, the transmittance of the sub-pixels is improved and the mode efficiency can be increased in the first display mode and the second display mode.

Reducing the thickness $d_1$ of the liquid crystal layer 20 with the retardation Δn of the liquid crystal material maintained the same improves the response time of the liquid crystal molecules 21 but causes the actual retardation of the liquid crystal layer 20 to be shifted from an estimated retardation (Δn·$d_1$) designed to provide a maximum transmittance. Thereby, the mode efficiency may be reduced in the first display mode and the second display mode. Fortunately, use of a weak anchoring alignment film for the first alignment film 41 can improve the mode efficiency in the first display mode and the second display mode.

The first alignment film 41 has an anchoring energy of $1 \times 10^{-9}$ J/m$^2$ or more and $1 \times 10^{-7}$ J/m$^2$ or less, for example. The second alignment film 42 has an anchoring energy of $1 \times 10^{-4}$ J/m$^2$ or more and $1 \times 10^{-2}$ J/m$^2$ or less, for example. Preferably, the difference in anchoring energy between the first alignment film 41 and the second alignment film 42 is $1 \times 10^{-3}$ J/m$^2$ or more and $1 \times 10^{-7}$ J/m$^2$ or less.

Examples of the strong anchoring film include films formed from a polymer such as a polyamic acid, polyimide, polyamide, or polysiloxane. The strong anchoring film may undergo an alignment treatment by rubbing or by exposure to light. In the case of performing an alignment treatment by exposure to light, the strong anchoring film is preferably a photoalignment film. The photoalignment film contains a photo-functional group such as an azobenzene group, a chalcone group, a cinnamate group, a coumarin group, a tolan group, a stilbene group, or a cyclobutane ring. The photo-functional group is a functional group that causes a change in its structure, such as dimerization (formation of dimers), isomerization, photo Fries rearrangement, or decomposition (cleavage) upon irradiation with light such as ultraviolet light or visible light (electromagnetic waves, preferably polarized light, more preferably polarized ultraviolet light, particularly preferably linearly polarized ultraviolet light), to exert alignment controlling force to liquid crystal molecules.

A weak anchoring film can be formed from a polymer brush that is formed by living radical polymerization. The polymer brush can be formed by, for example, immersing a substrate such as the first substrate 11 or the second substrate 31 in a liquid containing a radical polymerizable monomer and allowing living radical polymerization of the radical polymerizable monomer on a surface of the substrate.

Examples of the polymer of the radical polymerizable monomer include phenyl methacrylate (PhMA), polymethylmethacrylate (PMMA), and polystyrene (PS).

The liquid crystal device 1000 of the present embodiment includes the first polarizer 61 on the side closer to the active matrix substrate 10 and the second polarizer 62 on the side closer to the counter substrate 30. Meanwhile, the liquid crystal display device 1000 may not include at least one of the first polarizer 61 or the second polarizer 62. The side closer to the active matrix substrate 10 refers to the side farther from the liquid crystal layer 20 of the active matrix substrate 10, and the side closer to the counter substrate 30 refers to the side farther from the liquid crystal layer 20 of the counter substrate 30.

Preferably, the first polarizer 61 and the second polarizer 62 are each a linear polarizer. The first polarizer 61 and the second polarizer 62 are preferably arranged in crossed Nicols such that the absorption axis 61A and the absorption axis 62A are perpendicular to each other. Herein, in a plan view of a liquid crystal panel from the front surface side with the absorption axis 61A of the first polarizer 61 defined to be at 0°-180° azimuths and the absorption axis 62A of the second polarizer 62 defined to be at 90°-270° azimuths, left-right directions correspond to 0°-180° azimuths, up-down directions correspond to 90°-270° azimuths, and oblique direction(s) correspond to at least one of 45° azimuth, 135° azimuth, 225° azimuth, or 315° azimuth.

Figure 4:
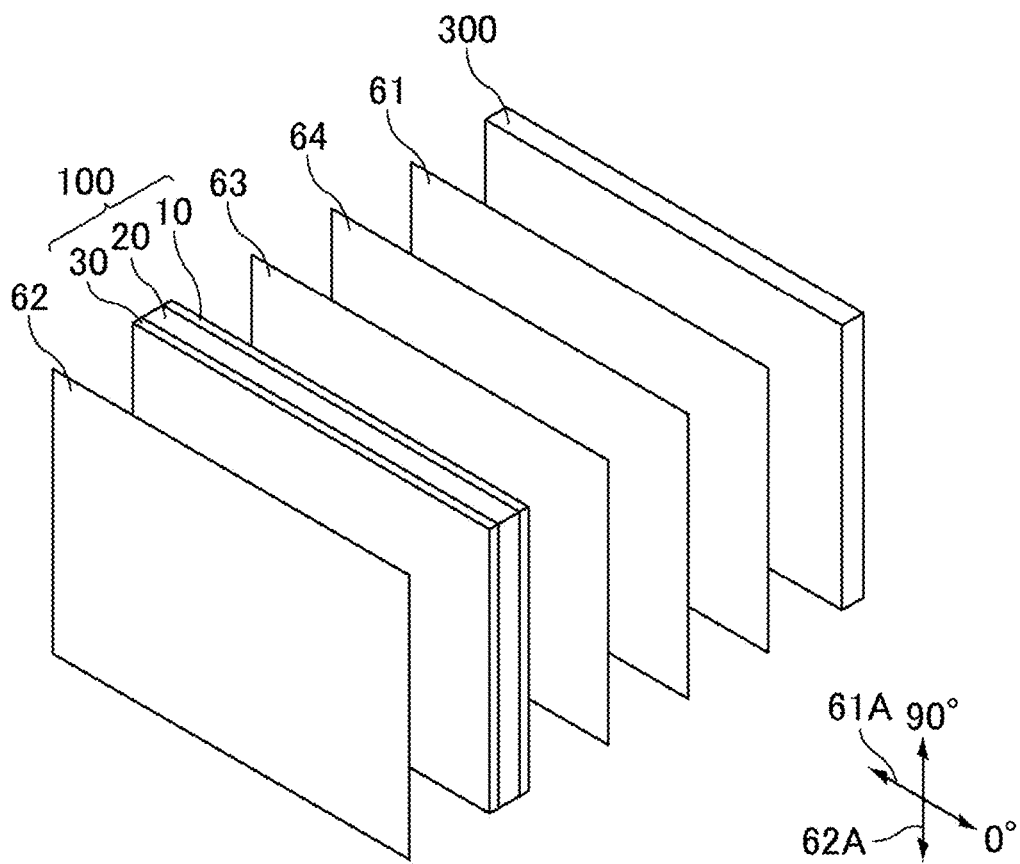
FIG. 4 is an exploded perspective view of an example of the liquid crystal display device of Embodiment 1.

Preferably, the liquid crystal panel 100 includes the first polarizer 61 on the side closer to the active matrix substrate 10, the second polarizer 62 on the side closer to the counter substrate 30, and a retardation film between the active matrix substrate 10 and the first polarizer 61. Examples of the retardation film include a positive A plate and a positive C plate. FIG. 4 is an exploded perspective view of an example of the liquid crystal display device of Embodiment 1. As shown in FIG. 4, when a backlight 300 is disposed on the back surface of the liquid crystal panel 100, the second polarizer 62, the liquid crystal panel 100, a positive C plate 63, a positive A plate 64, the first polarizer 61, and the backlight 300 may be disposed in the stated order.

An example of the positive A plate is a λ/4 plate. The λ/4 plate may be one that exerts an in-plane retardation of a ¼ wavelength (110 to 170 nm) to at least light having a wavelength of 550 nm. The in-plane retardation and the retardation in the thickness direction herein each mean the retardation of a film at a wavelength of 550 nm, unless otherwise stated. An in-plane retardation Re can be determined according to Re=(nx−ny)×$d_2$, wherein $d_2$ (nm) represents the thickness of the film. A retardation Rth in the thickness direction can be determined according to Rth=(nx−nz)×$d_2$. In the formulas, "nx" represents the refractive index in a direction with a maximum in-plane refractive index (i.e., the slow axis direction), "ny" represents the refractive index in a direction perpendicular to the slow axis in the plane, and "nz" represents the refractive index in the thickness direction.

As shown in FIG. 4, the liquid crystal display device according to the embodiment preferably further includes the backlight 300 on the back surface side (active matrix substrate side) of the liquid crystal panel 100.

Figure 5:
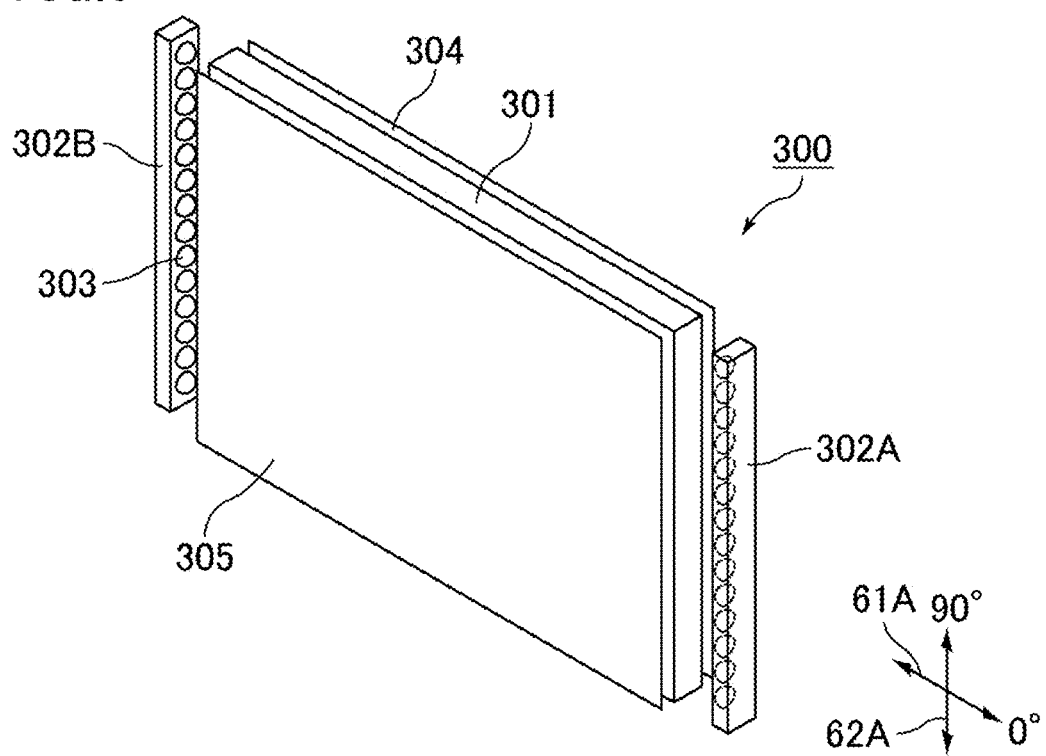
FIG. 5 is an exploded perspective view of an example of the structure of a backlight.

FIG. 5 is an exploded perspective view of an example of the structure of a backlight. The backlight 300 is an edge-lit backlight. As shown in FIG. 5, the backlight 300 may include a light guide plate 301, two light sources 302A and 302B at the respective side surfaces of the light guide plate 301, a reflector 304 at the back surface of the light guide plate 301, and an optical film 305 between the light guide plate 301 and the liquid crystal panel 100.

The light guide plate 301 is disposed such that the left-right directions of the light guide plate 301 correspond to the short-side directions of the sub-pixels of the liquid crystal panel 100. The light sources 302A and 302B are respectively disposed at the right side surface and the left side surface of the light guide plate 301. Light emitted by the light source 302A on the right of the light guide plate 301 toward the light guide plate 301 propagates from the right to the left of the light guide plate 301 and is then emitted from the left of the light guide plate 301 toward the liquid crystal panel 100. Light emitted from the light source 302B on the left of the light guide plate 301 toward the light guide plate 301 propagates from the left to the right of the light guide plate 301 and is then emitted from the right of the light guide plate 301 toward the liquid crystal panel 100. The light sources 302A and 302B may each include multiple light emitting diodes (LEDs) 303.

The reflector 304 may be any reflector that can reflect light, which is emitted from the light guide plate 301 toward the back surface side, to the side with the light guide plate 301, and an example is a reflection film such as an enhanced specular reflector (ESR) film (available from 3M Ltd.).

The optical film 305 is preferably an optical film (3D film) providing different luminances according to the viewing angle range in the front view of the liquid crystal panel. The 3D film has on its surface thereof convex portions such as prisms, for example, and thereby controls the angle of light emitted from the backlight toward the liquid crystal panel. The 3D film thus can allow light incident from the light sources on the light guide plate to be emitted in a certain viewing angle range. The 3D film may be a 3D film disclosed in US 2017/0059898 A.

Figure 6:
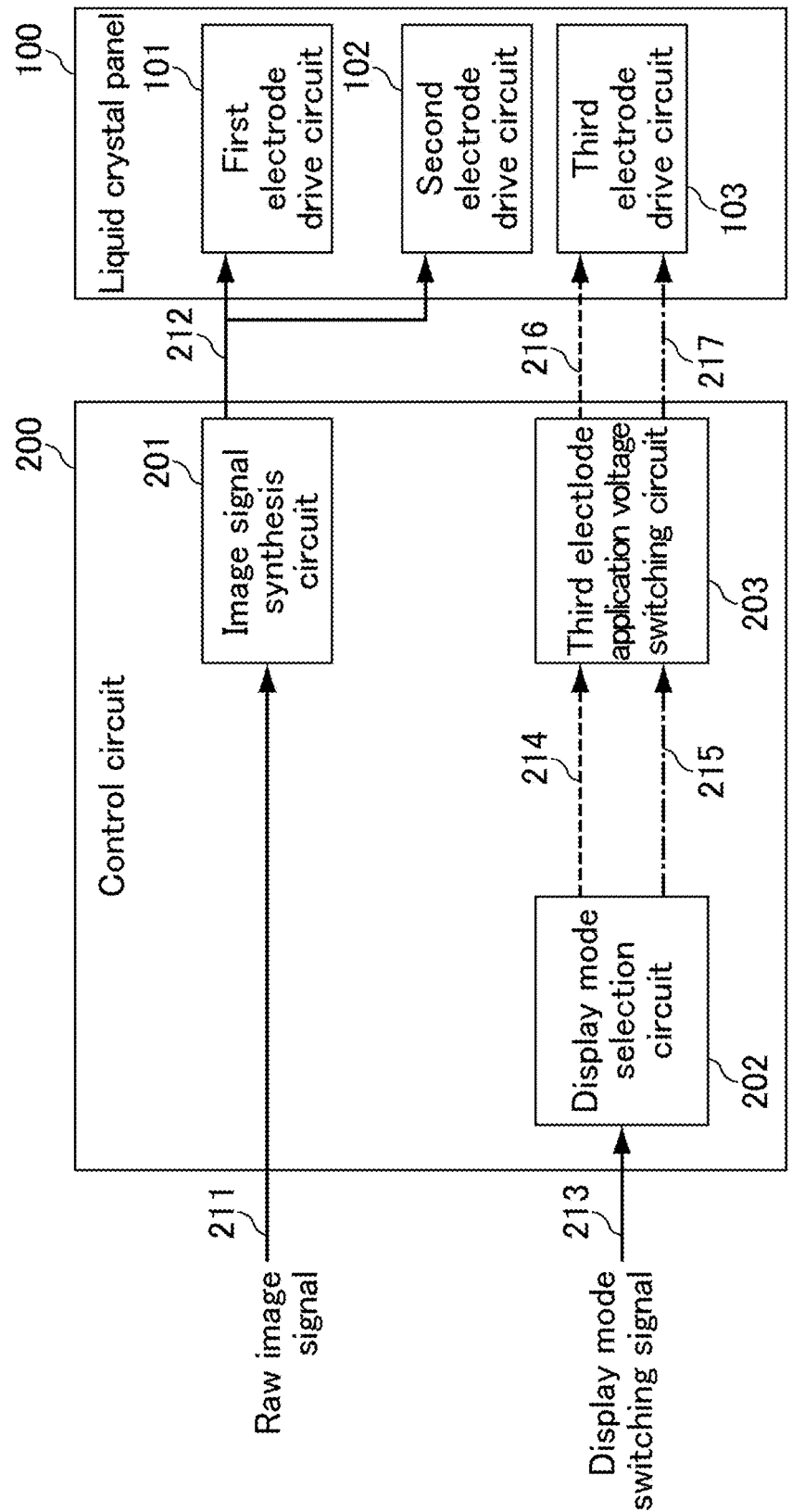
FIG. 6 is a block diagram schematically showing a display method for a first display mode, a second display mode, and a third display mode.

A method for switching the display modes is described below with reference to FIG. 6 to FIG. 11. FIG. 6 is a block diagram schematically showing a display method for a first display mode, a second display mode, and a third display mode. As shown in FIG. 6, the liquid crystal display device according to the embodiment includes the liquid crystal panel 100 and a control circuit 200. The liquid crystal panel 100 may include a first electrode drive circuit 101 that applies voltage to the first electrodes 12, a second electrode drive circuit 102 that applies voltage to the second electrodes 14, and a third electrode drive circuit 103 that applies voltage to the third electrode 34. The control circuit 200 may include an image signal synthesis circuit 201, a display mode selection circuit 202, and a third electrode application voltage switching circuit 203. In FIG. 6, the first electrode drive circuit 101, the second electrode drive circuit 102, and the third electrode drive circuit 103 are included in the liquid crystal panel 100. Alternatively, they may be included in the control circuit 200.

As shown in FIG. 6, to an image signal synthesis circuit 201 is input a raw image signal 211 for displaying a desired image, for example, and the image signal synthesis circuit 201 outputs an image signal 212 in response to the input raw image signal 211 to the first electrode drive circuit 101 and the second electrode drive circuit 102.

The control circuit 200 may switch between the first display mode that allows a first image to be observed in a narrow viewing angle range including the direction normal to the liquid crystal panel 100 (such a mode is also referred to as a narrow viewing angle mode) and the second display mode that allows the first image to be observed in a wide viewing angle range including the narrow viewing angle range (such a mode is also referred to as a wide viewing angle mode).

In the narrow viewing angle range, preferably, the contrast ratio is less than 2 in observation of the liquid crystal panel from an oblique direction (at an azimuth angle of 45°, 135°, 225°, or 315°) at a certain or higher polar angle. The polar angle is herein defined to be 0° in the direction vertical to a surface of a liquid crystal panel, and to be 90° in the direction parallel to the surface of the liquid crystal panel. For example, the polar angle satisfying a contrast ratio of less than 2 is preferably 60° or greater, more preferably 45° or greater, still more preferably 30° or greater. In other words, in the narrow viewing angle mode, preferably, the contrast ratio is less than 2 in observation at at least one azimuth selected from the azimuth angles of 0°, 45°, 90°, 135°, 180°, 225°, 270°, and 315° in a polar angle range excepting a polar angle of 0° (front), i.e., at a polar angle of 60° or greater, more preferably 45° or greater, still more preferably 30° or greater. In the narrow viewing angle mode, the contrast ratio at a polar angle of 0° (front) is preferably 10 or higher, more preferably 20 or higher.

The wide viewing angle range means the range having a polar angle greater than that in the narrow viewing angle range. The wide viewing angle mode is preferably a mode that allows the contrast ratio to be 2 or higher, more preferably 10 or higher, at at least two azimuths selected from the azimuth angles 45°, 135°, 225°, and 315° in a polar angle range of 60° or greater and smaller than 90°.

The control circuit 200 switches between application of alternating voltage and application of constant voltage to the third electrode 34. Controlling the voltage applied to the third electrode 34 can switch between the first display mode (narrow viewing angle mode) and the second display mode (wide viewing angle mode). For example, as shown in FIG. 6, the third electrode application voltage switching circuit 203 inputs an alternating signal 216 or a constant voltage signal 217 to the third electrode drive circuit 103 according to the received display mode selection signal so as to switch between application of alternating voltage and application of constant voltage to the third electrode 34.

The constant voltage is a reference voltage for driving the liquid crystal display device. For example, a certain voltage may be applied to the first electrodes 12 or the second electrodes 14, or the first electrodes 12 or the second electrodes 14 may be grounded. In the case where the constant voltage is applied to the third electrode 34, the corresponding electrode may be electrically connected to the first electrodes 12 or the second electrodes 14; the constant voltage common to the first electrodes 12 or the second electrodes 14 may be applied to the corresponding electrode through a signal line different from the first electrodes 12 or the second electrodes 14; or the third electrode 34 may be grounded.

In the first display mode, preferably, the control circuit 200 applies alternating voltage to the third electrode 34. The display mode selection circuit 202 receives a display mode switching signal 213 for switching between the first display mode and the second display mode. When the first display mode is selected, as shown in FIG. 6, the display mode selection circuit 202 outputs a first display mode selection signal 214 to the third electrode application voltage switching circuit 203. When receiving the first display mode selection signal 214 from the display mode selection circuit 202, the third electrode application voltage switching circuit 203 outputs an alternating signal 216 to the third electrode drive circuit 103 so as to apply a given magnitude of alternating voltage to the third electrode 34.

In the case of providing black display in the narrow viewing angle mode, for example, the control circuit 200 applies common voltage to the second electrodes 14 and the first electrodes 12 while applying alternating voltage to the third electrode 34. For example, black display can be provided by applying common voltage to the first electrodes 12 and the second electrodes 14 while applying to the third electrode 34 an alternating voltage of 4 V relative to the common voltage.

Figure 7:
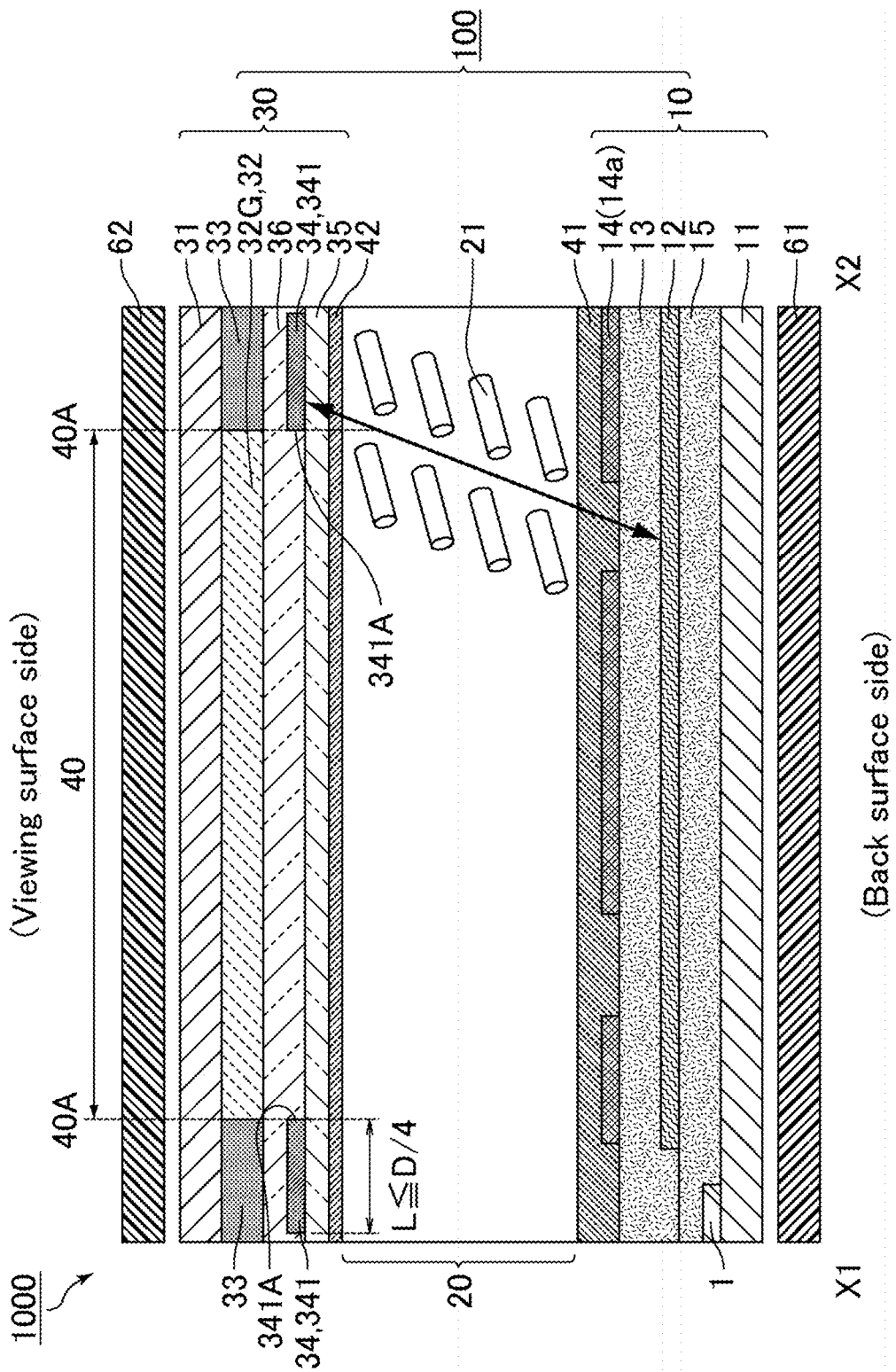
FIG. 7 is a schematic cross-sectional view of a sub-pixel in black display in the narrow viewing angle mode.

FIG. 7 is a schematic cross-sectional view of a sub-pixel in black display in the narrow viewing angle mode. As shown in FIG. 7, an oblique electric field is formed between the first electrode 12 and the third electrode 34 in the thickness direction of the liquid crystal layer 20. Therefore, the tilt angle of the liquid crystal molecules 21 with respect to the active matrix substrate 10 and the counter substrate 30 is greater than the pre-tilt angle with no voltage applied.

Figure 8:
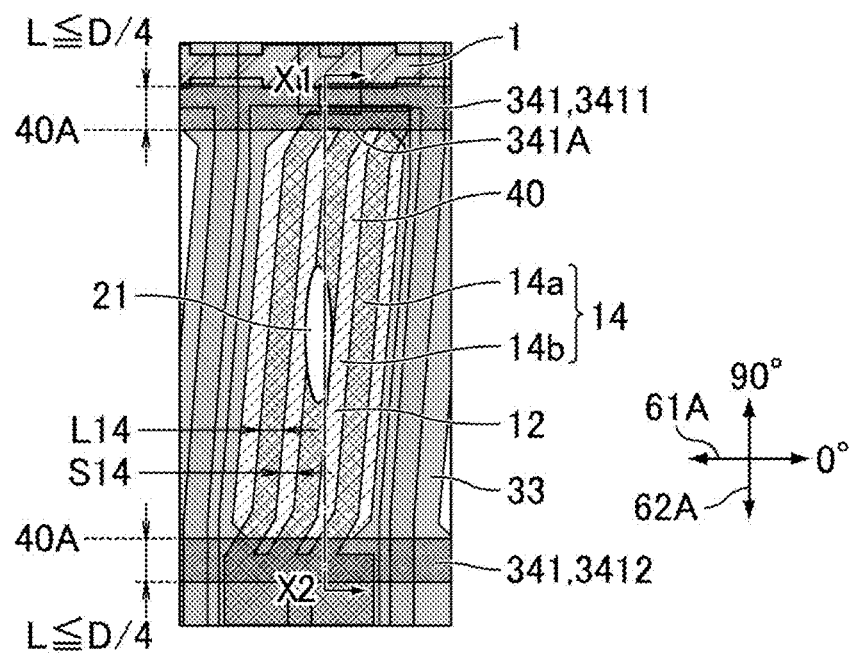
FIG. 8 is a schematic plan view of a sub-pixel in black display in the narrow viewing angle mode.

FIG. 8 is a schematic plan view of a sub-pixel in black display in the narrow viewing angle mode. With the alignment azimuth of the liquid crystal molecules 21 set to be parallel to the absorption axis 61A of the first polarizer 61 or the absorption axis 62A of the second polarizer 62 in a plan view, black display is provided without light from the back surface of the liquid crystal panel passing through the liquid crystal layer 20. FIG. 8 shows the case where the alignment azimuth of the liquid crystal molecules 21 is made parallel to the absorption axis 62A of the second polarizer 62. The black display refers to a display state at a lowest luminance (grayscale level of 0).

In the case of providing grayscale display in the narrow viewing angle mode, for example, the control circuit 200 applies common voltage to the first electrodes 12 or the second electrodes 14 and applies a voltage different from the common voltage to the other while applying alternating voltage to the third electrode 34. For example, grayscale display from black display to white display can be provided by applying common voltage to the second electrodes 14 and adjusting the voltage applied to the first electrodes 12 from 0 V to 4 V relative to the common voltage while applying to the third electrode 34 an alternating voltage of 4 V relative to the common voltage.

Described here is the case where grayscale display is provided by applying common voltage to the second electrodes 14 and applying a certain alternating voltage to the first electrodes 12. Alternatively, grayscale display can be provided by applying common voltage to the first electrodes 12 and applying a certain alternating voltage to the second electrodes 14. The white display refers to a display state at a highest luminance (grayscale level of 255).

Figure 9:
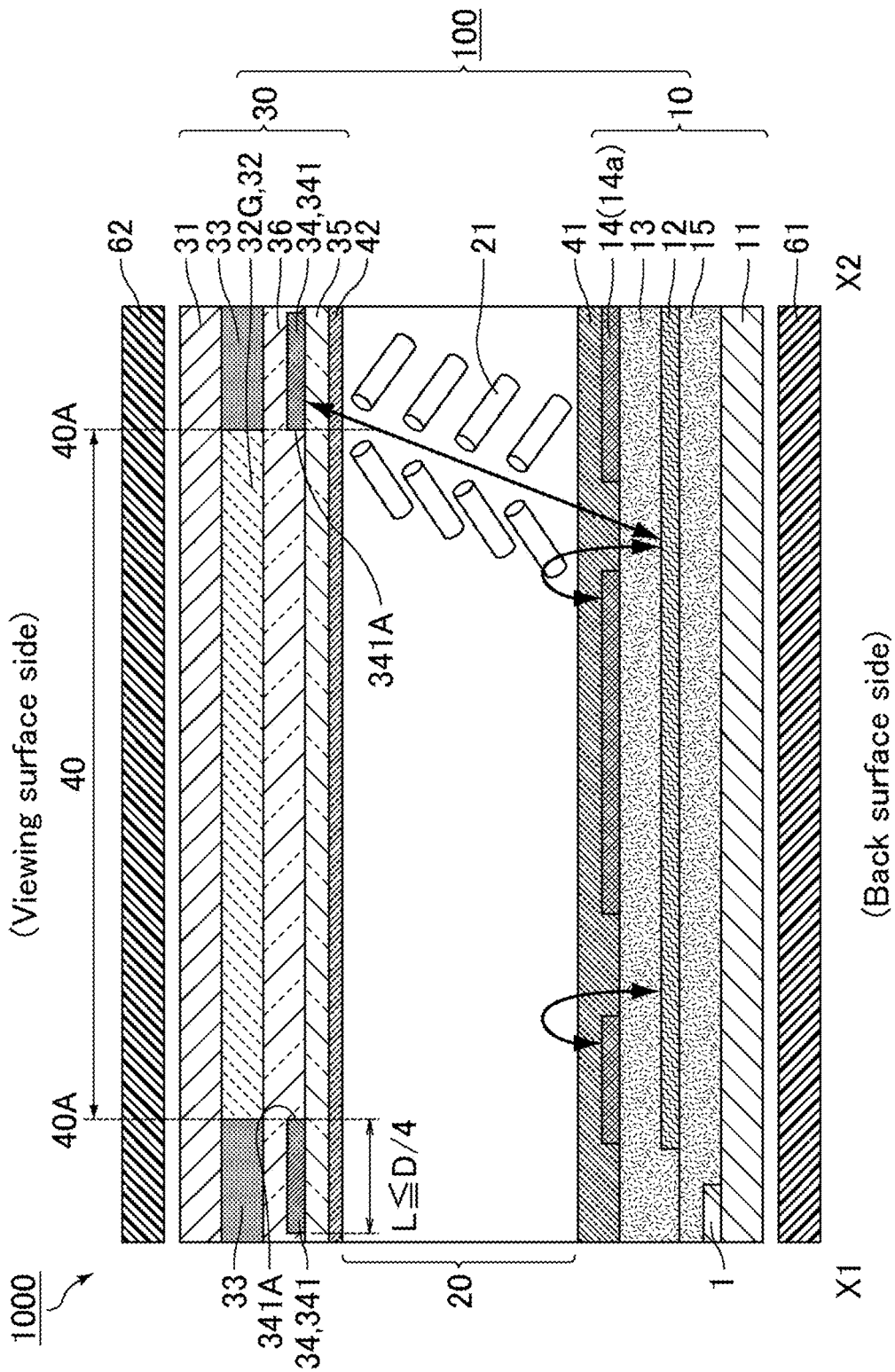
FIG. 9 is a schematic cross-sectional view of a sub-pixel in white display in the narrow viewing angle mode.

FIG. 9 is a schematic cross-sectional view of a sub-pixel in white display in the narrow viewing angle mode. As shown in FIG. 9, a fringe electric field is formed between the first electrode 12 and the second electrode 14, and an oblique electric field in the thickness direction of the liquid crystal layer 20 is formed between the third electrode 34 and the first electrode 12. Then, an electric field formed by synthesis of the fringe electric field and the oblique electric field is formed between the third electrode 34 and the group including the first electrode 12 and the second electrode 14. Thus, the liquid crystal molecules 21 change the alignment azimuth while forming an angle with respect to the active matrix substrate 10.

Figure 10:
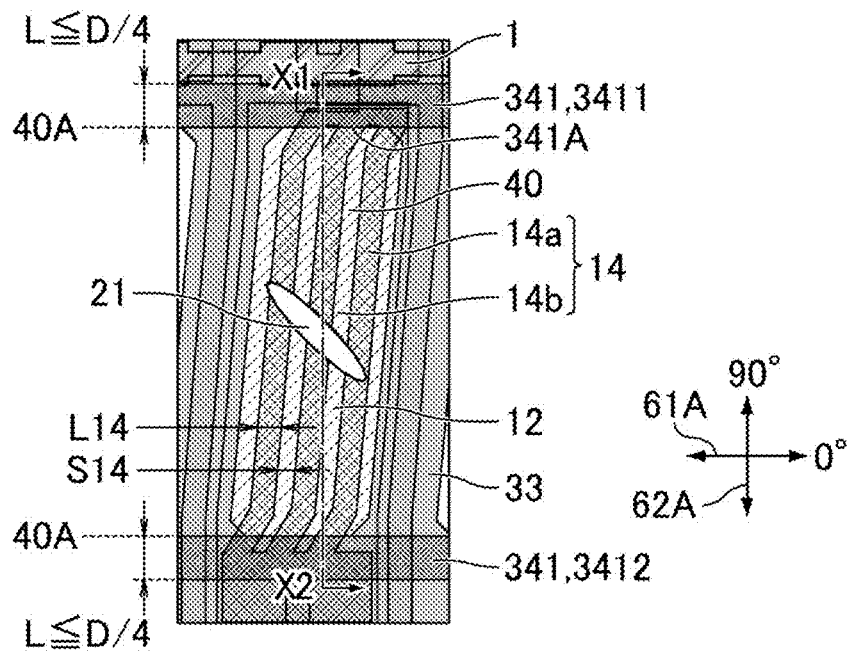
FIG. 10 is a schematic plan view of a sub-pixel in white display in the narrow viewing angle mode.

FIG. 10 is a schematic plan view of a sub-pixel in white display in the narrow viewing angle mode. As shown in FIG. 10, the fringe electric field formed between the first electrode 12 and the second electrode 14 allows the liquid crystal molecules 21 to rotate in the plane of the liquid crystal layer 20 to change their azimuth from the initial alignment azimuth. As a result, the major axis direction of the liquid crystal molecules 21 forms an angle with the absorption axis 61A of the first polarizer and the absorption axis 62A of the second polarizer to allow light from the back surface of the liquid crystal panel to pass through. Here, the liquid crystal molecules 21 form a greater angle with the active matrix substrate 10 than the case of providing grayscale display in the wide viewing angle mode described later. Accordingly, the first image is observable in the narrow viewing angle range, while the first image can be less observable in the wide viewing angle range due to a change caused to the image, such as an extremely reduced contrast ratio.

In the second display mode, preferably, the control circuit 200 applies to the third electrode 34 constant voltage common to the first electrodes 12 or the second electrodes 14. When the second display mode is selected, as shown in FIG. 6, the display mode selection circuit 202 outputs a second display mode selection signal 215 to the third electrode application voltage switching circuit 203. When receiving the second display mode selection signal 215 from the display mode selection circuit 202, the third electrode application voltage switching circuit 203 outputs a constant voltage signal 217 to the third electrode drive circuit 103 so as to apply to the third electrode 34 constant voltage common to the first electrodes 12 or the second electrodes 14.

In the case of providing black display in the wide viewing angle mode, for example, the control circuit 200 applies common voltage to the second electrodes 14 and the first electrodes 12, and applies to the third electrode 34 the constant voltage common to the first electrode 12 and the second electrodes 14. FIG. 2 is also a schematic cross-sectional view of one sub-pixel in black display in the wide viewing angle mode. As shown in FIG. 2, since no electric field is generated in the liquid crystal layer 20, the liquid crystal molecules 21 are aligned at the initial alignment azimuth. With no voltage applied to the liquid crystal layer 20, preferably, the liquid crystal molecules 21 are aligned parallel to the surface of the active matrix substrate 10 and the surface of the counter substrate 30. The alignment azimuth of the liquid crystal molecules in black display in the wide viewing angle mode in a plan view is similar to that of FIG. 8, and thus descriptions therefor are omitted here.

In grayscale display in the wide viewing angle mode, for example, the control circuit 200 applies common voltage to the first electrodes 12 or the second electrodes 14 and applies magnitudes of voltage different from the common voltage to the other, while applying to the third electrode 34 constant voltage common to the first electrodes 12 or the second electrodes 14. For example, when common voltage is applied to the second electrodes 14, the alternating voltage applied to the first electrodes 12 is adjusted to 0 V to 4 V while constant voltage (0 V) common to the common voltage is applied to the third electrode 34, whereby grayscale display from black display to white display can be provided. Described here is the case where grayscale display is provided by applying common voltage to the second electrodes 14 and applying a certain alternating voltage to the first electrodes 12. Alternatively, grayscale display can be provided by applying common voltage to the first electrodes 12 and applying a certain alternating voltage to the second electrodes 14.

Figure 11:
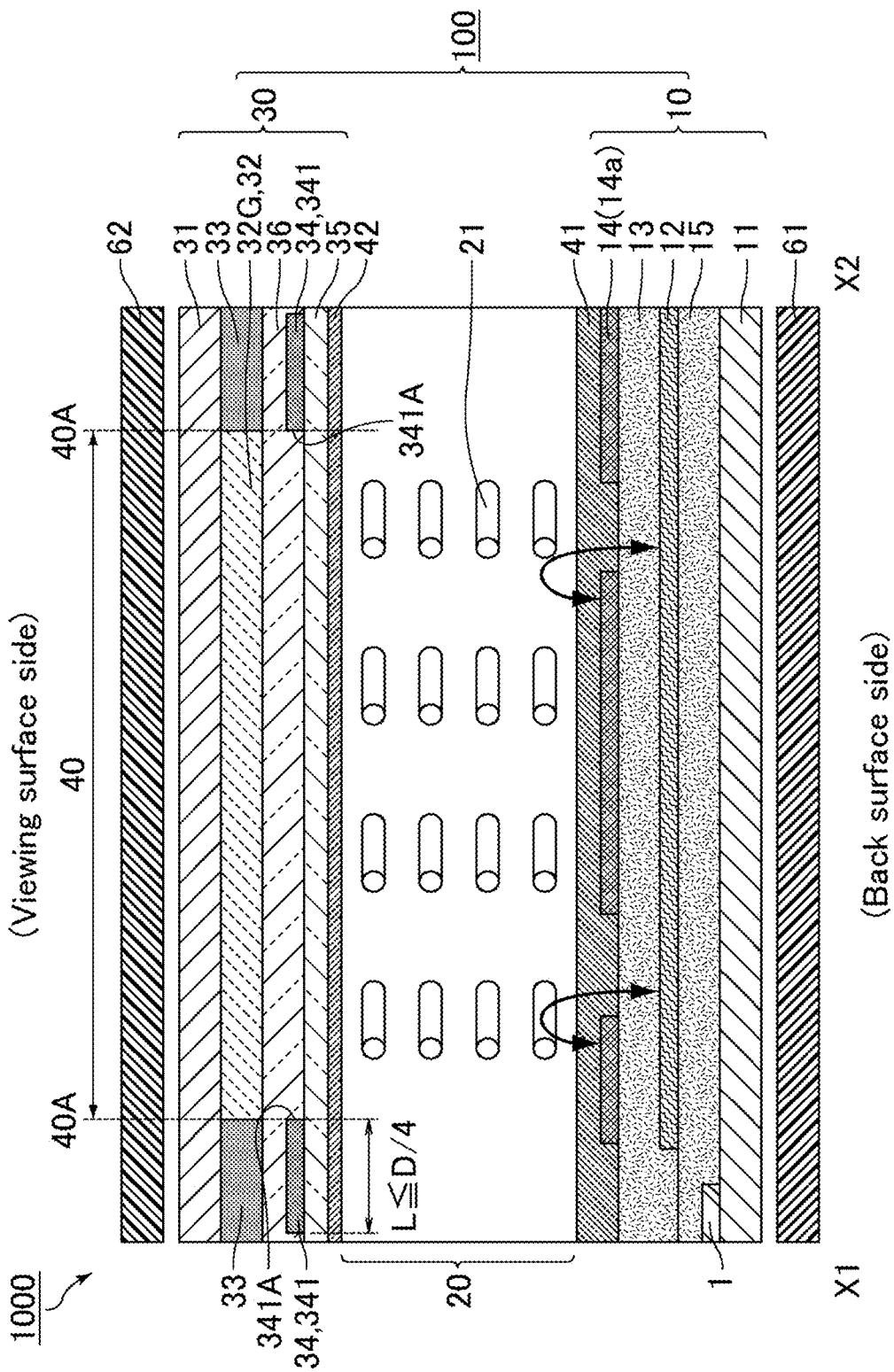
FIG. 11 is a schematic cross-sectional view of a sub-pixel in white display in the wide viewing angle mode.

FIG. 11 is a schematic cross-sectional view of a sub-pixel in white display in the wide viewing angle mode. As shown in FIG. 11, no electric field is formed in the thickness direction of the liquid crystal layer 20, while a fringe electric field is formed between the first electrode 12 and the second electrode 14. A plan view of the alignment azimuth of liquid crystal molecules in white display in the wide viewing angle mode is the same as FIG. 10, and thus descriptions therefor are omitted here.

The control circuit 200 inputs different image signals to the first sub-pixel 70 and the second sub-pixel 71 such that a second image different from the first image is observed in the wide viewing angle range. Such a display method is also referred to as a veil-view function. Preferably, the second image is a veil-view pattern.

In the present embodiment, a veil-view pattern (including a dummy pattern) in which the luminance and chromaticity are set for each grayscale level such that no veil-view pattern is observed from the left-right directions and/or oblique directions of the liquid crystal panel 100 and a veil-view pattern is observed from other directions, whereby better narrow viewing angle characteristics are achieved.

Display with the veil-view function can enhance the privacy in combination with any of the first display mode and the second display mode. Still, combination with the first display mode can further enhance the privacy.

The structure with the counter substrate 30 including the third electrode 34 can generate a weak vertical electric field between the third electrode 34 and the first electrodes 12 even when common voltage is applied to the third electrode 34. The weak vertical electric field formed in the thickness direction of the liquid crystal layer 20 slightly increases the tilt angle of the liquid crystal molecules 21 with respect to the active matrix substrate 10 and the counter substrate 30 as compared with the case with no voltage applied. Providing grayscale display by applying a certain alternating voltage to the first electrodes 12 or the second electrodes 14 while slightly raising the liquid crystal molecules 21 can cause a large difference in luminance between a sub-pixel (first sub-pixel 70) on the odd-number row side and a sub-pixel (second sub-pixel 71) on the even-number row side in observation from not only the oblique directions but also the left-right directions, which provides γ curves showing a sufficiently large contrast ratio of odd-number row-side sub-pixel/even-number row-side sub-pixel. Accordingly, a veil-view pattern is perceivable in observation of the display screen of the liquid crystal panel from not only the oblique directions but also the left-right directions. When a certain alternating voltage is applied to the third electrode 34, the tilt angle of the liquid crystal molecules 21 is increased to further enhance the privacy.

Hereinafter, an exemplary method of displaying an image using the veil-view function is described with reference to FIG. 12 to FIG. 17. FIG. 12 to FIG. 16 schematically show the first sub-pixel 70 and the second sub-pixel 71 shown in the drawings including FIG. 1.

Figure 12:
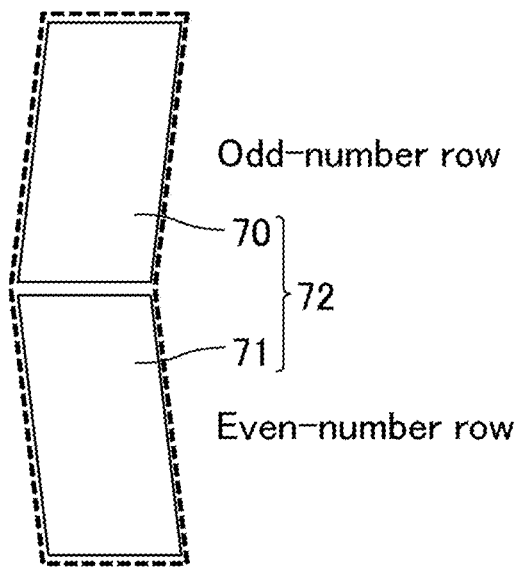
FIG. 12 is a schematic plan view showing an exemplary display unit in a liquid crystal panel.
Figure 13:
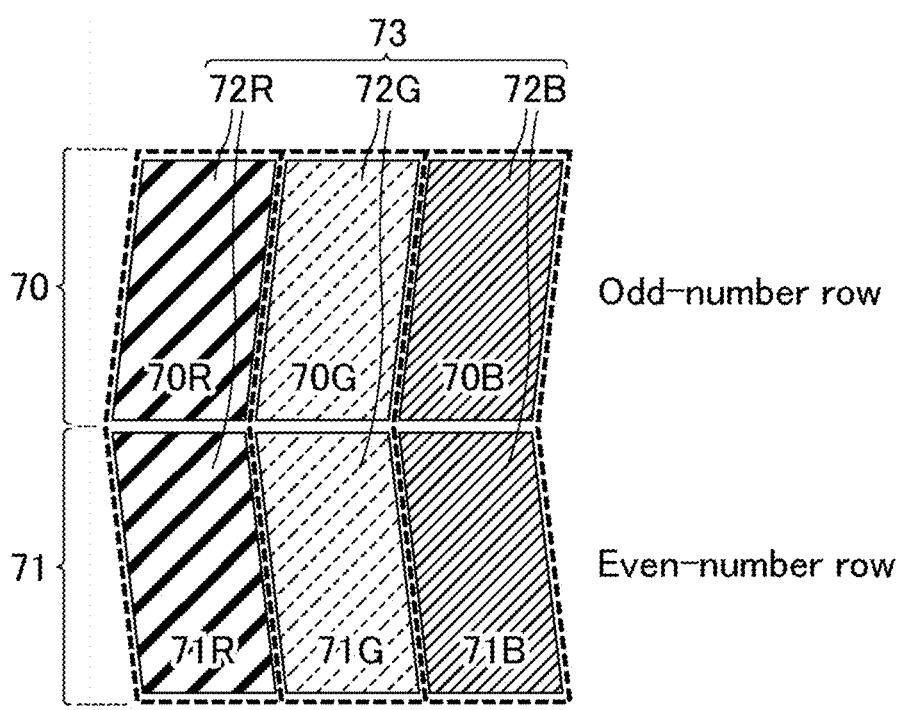
FIG. 13 is a schematic plan view showing an exemplary color element for color display using a veil-view function.

FIG. 12 is a schematic plan view showing an exemplary display unit in a liquid crystal panel. FIG. 13 is a schematic plan view showing an exemplary color element for color display using the veil-view function. The liquid crystal panel 100 preferably includes display units 72 for displaying an image using the veil-view function. As shown in FIG. 12, each display unit 72 includes, among the multiple sub-pixels, a pair of sub-pixels arranged adjacent to each other, one of the sub-pixels being a first sub-pixel 70 selected from an odd-number row and the other being a second sub-pixel 71 selected from an even-number row. As shown in FIG. 1, the second electrode 14 disposed in the first sub-pixel 70 and the second electrode 14 disposed in the second sub-pixel 71 may have linear electrode portions 14a that extend in different directions and are line-symmetric with respect to a gate line 1.

As shown in FIG. 13, for color display, the liquid crystal panel 100 preferably includes a red display unit 72R including a first red sub-pixel 70R and a second red sub-pixel 71R, a green display unit 72G including a first green sub-pixel 70G and a second green sub-pixel 71G, and a blue display unit 72B including a first blue sub-pixel 70B and a second blue sub-pixel 71B. The first red sub-pixel 70R and the second red sub-pixel 71R are each superimposed with a red color filter 32R in an optical opening. The first green sub-pixel 70G and the second green sub-pixel 71G are each superimposed with a green color filter 32G in an optical opening. The first blue sub-pixel 70B and the second blue sub-pixel 71B are each superimposed with a blue color filter 32B in an optical opening.

The first sub-pixel 70 and the second sub-pixel 71 may each be considered as one sub-pixel as shown in FIG. 13, or a combination of a first red sub-pixel 70R, a first green sub-pixel 70G, and a first blue sub-pixel 70B may be regarded as the first sub-pixel 70 and a combination of a second red sub-pixel 71R, a second green sub-pixel 71G, and a second blue sub-pixel 71B may be regarded as the second sub-pixel 71. For color display by an ordinary display method for displaying a raw image alone, the sub-pixels including red, green, and blue pixels are independently driven. In the ordinary color display for displaying a raw image alone, the display can be at a resolution twice that of the color display using the veil-view function. In order to achieve a wider viewing angle, a raw image may be displayed without using display with the veil-view function in the second display mode (wide viewing angle mode).

An image can be displayed using the veil-view function by, for example, dividing the luminance data value of the raw image desired to be displayed as a first image, Data 1, into two equivalent data values Data 2 and Data 3, inputting the data value of Data 1+Data 2 to the first sub-pixel 70 or the second sub-pixel 71, and inputting the data value of Data 1−Data 3 to the other. When the liquid crystal panel is observed from a normal direction, for example, the luminance of the first sub-pixel 70 and the luminance of the second sub-pixel 71 are spatially averaged to be recognized as the luminance of the raw image. Meanwhile, when the liquid crystal panel is observed from a certain polar angle, the luminances are recognized as the luminance Data 1+Data 2 or the luminance Data 1−Data 3. Thereby, a raw image is perceived from the normal direction of the liquid crystal panel, while an image different from the raw image can be perceived in observation from a certain polar angle range.

The image that is different from the raw image and is displayed using the veil-view function is also referred to as a veil-view pattern. The veil-view pattern is a display image that is to be superimposed with the first image to make the first image less perceivable. Displaying the veil-view pattern further enhances the privacy.

The polar angle range in which the veil-view pattern is perceived may be the same as or different from the wide viewing angle range. The veil-view pattern may be perceived in any polar angle range and may be in a range of 45° or greater, for example, wherein the direction vertical to the surface of the liquid crystal panel is defined as a polar angle of 0° and the direction parallel to the surface of the liquid crystal panel is defined as a polar angle of 90°. The polar angle range in which the veil-view pattern is perceivable may be more preferably 30° or greater, still more preferably 20° or greater.

The deepness of the veil-view pattern (easiness for perception) can be adjusted by adjusting the luminance levels of the first sub-pixel 70 and the second sub-pixel 71. Adjusting the deepness of the veil-view pattern can appropriately set the polar angle range in which the veil-view pattern is perceivable.

Figure 14:
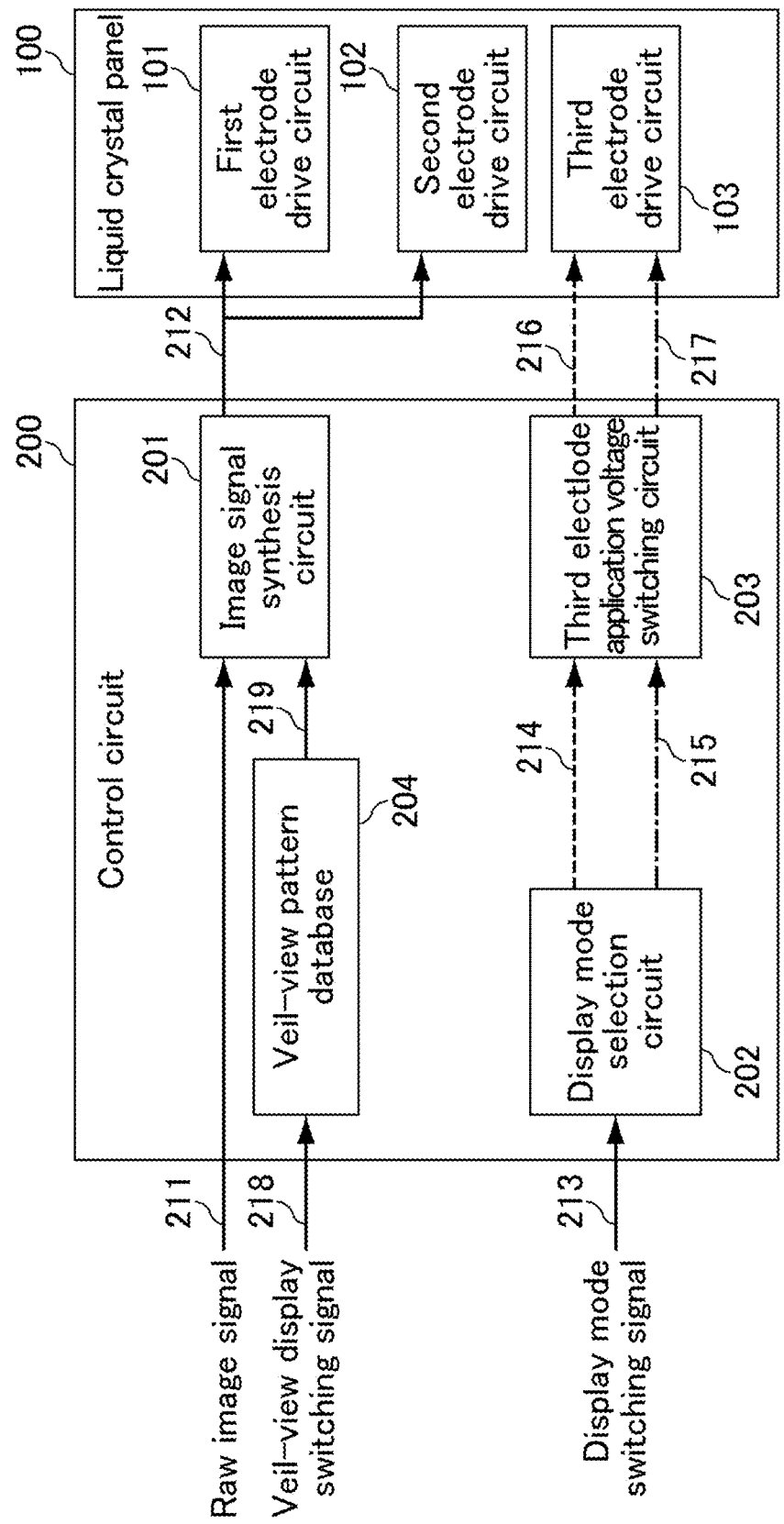
FIG. 14 is a block diagram schematically showing a method for displaying a veil-view pattern.

Hereinafter, the method of displaying a veil-view pattern is described with reference to FIG. 14. FIG. 14 is a block diagram schematically showing a method for displaying a veil-view pattern. As shown in FIG. 14, the control circuit 200 may further include the database 204 in which information related to the veil-view patterns is stored. When receiving a veil-view display switching signal 218, the database 204 outputs a veil-view image signal 219 to the image signal synthesis circuit 201. The image signal synthesis circuit 201 outputs an image signal 212 formed by synthesis of the raw image signal 211 and the veil-view image signal 219 to the first electrode drive circuit 101 and the second electrode drive circuit 102. When the display mode selection circuit 202 inputs a first display mode selection signal 214, the database 204 may output a veil-view pattern image signal 219 to the image signal synthesis circuit 201.

For example, when the second electrode drive circuit 102 applies common voltage to the second electrodes 14, the first electrode drive circuit 101 applies different magnitudes of voltage to the first electrodes 12 corresponding to the first sub-pixel 70 and the second sub-pixel 71 such that the veil-view pattern is observed. When the first electrode drive circuit 101 applies constant voltage to the first electrodes 12, the second electrode drive circuit 102 applies different magnitudes of voltage to the second electrodes 14 corresponding to the first sub-pixel 70 and the second sub-pixel 71 such that the veil-view pattern is observed.

Figure 15:
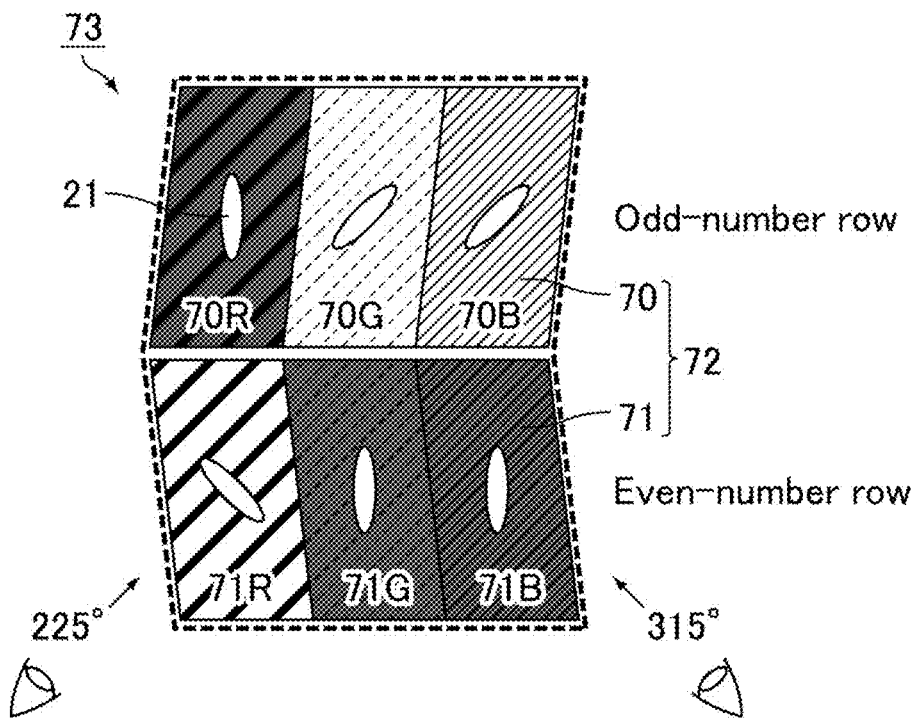
FIG. 15 is a schematic plan view showing an exemplary display pattern for color elements.
Figure 16:
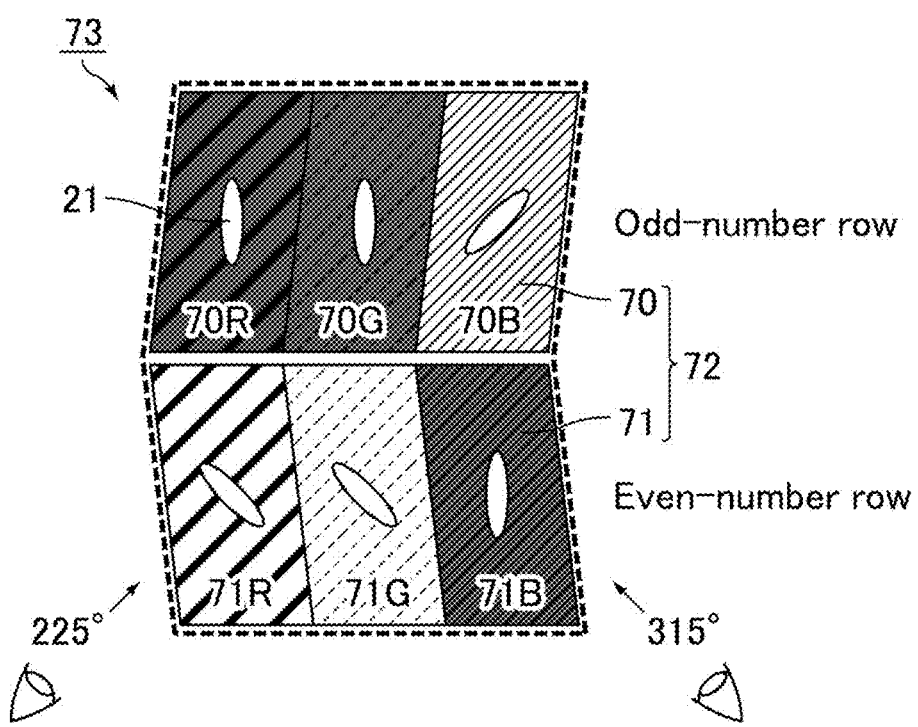
FIG. 16 is a schematic plan view showing another exemplary display pattern for color elements.

FIG. 15 is a schematic plan view showing an exemplary display pattern for color elements. FIG. 16 is a schematic plan view showing another exemplary display pattern for color elements. A row in which a first sub-pixel 70 is arranged is also referred to as an odd-number row. A row in which a second sub-pixel 71 is arranged is also referred to as an even-number row. As shown in FIG. 15, when the first red sub-pixel 70R, the second green sub-pixel 71G, and the second blue sub-pixel 71B are displayed in black and the second red sub-pixel 71R, the first green sub-pixel 70G, and the first blue sub-pixel 70B are displayed in white, the liquid crystal molecules present in the second red sub-pixel 71R in observation at an azimuth of 225° are observed from the direction of the minor axes of the liquid crystal molecules in which the retardation is high, and thus a red color is observed. In contrast, the liquid crystal molecules in the first green sub-pixel 70G and the first blue sub-pixel 70B are observed from the direction of the major axes of the liquid crystal molecules in which the retardation is low, so that the corresponding colors are not observed. As a result, the red color is perceived.

Meanwhile, in observation at an azimuth of 315°, the liquid crystal molecules in the first green sub-pixel 70G and the first blue sub-pixel 70B are observed from the direction of the minor axes of the liquid crystal molecules, so that a cyan color, which is a mixture of blue and green colors, is perceived. Here, the liquid crystal molecules in the second red sub-pixel 71R are observed from the direction of the major axes of the liquid crystal molecules, so that the corresponding color is not observed. As a result, the cyan color is perceived. As shown in FIG. 16, when the first red sub-pixel 70R, the first green sub-pixel 70G, and the second blue sub-pixel 71B are displayed in black and the second red sub-pixel 71R, the second green sub-pixel 71G, and the first blue sub-pixel 70B are displayed in white, observation at an azimuth of 225° results in perception of a yellow color, which is a mixture of red and green colors, and observation at an azimuth of 315° results in perception of a blue color.

Figure 17:
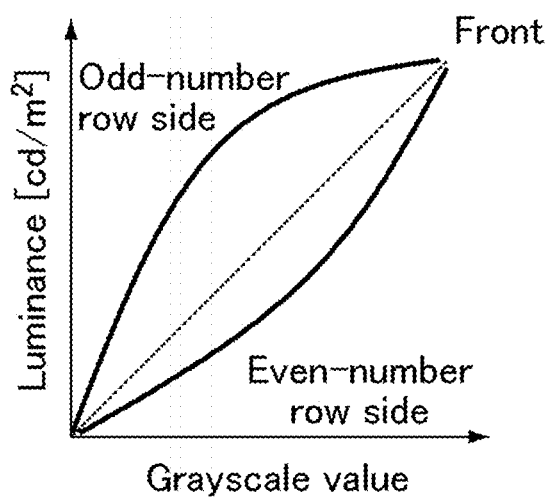
FIG. 17 is an example of γ curves of a liquid crystal panel.

When the display pattern of the color elements shown in FIG. 15 and the display pattern of color elements in FIG. 16 are combined, observation from the direction normal to the liquid crystal panel (from the front) results in observation of white display. FIG. 17 is an example of y curves of a liquid crystal panel. As shown in FIG. 17, in the range of intermediate values, the difference in contrast ratio between an image formed by sub-pixels on the odd-number row side and an image formed by sub-pixels on the even-number row side is large in observation from a certain direction because the luminances therebetween are different from each other. A veil-view pattern is preferably formed in such an intermediate value range in which a sufficient difference (contrast ratio) in perception between sub-pixels on the odd-number rows and sub-pixels on even-number rows can be achieved.

Figure 19:
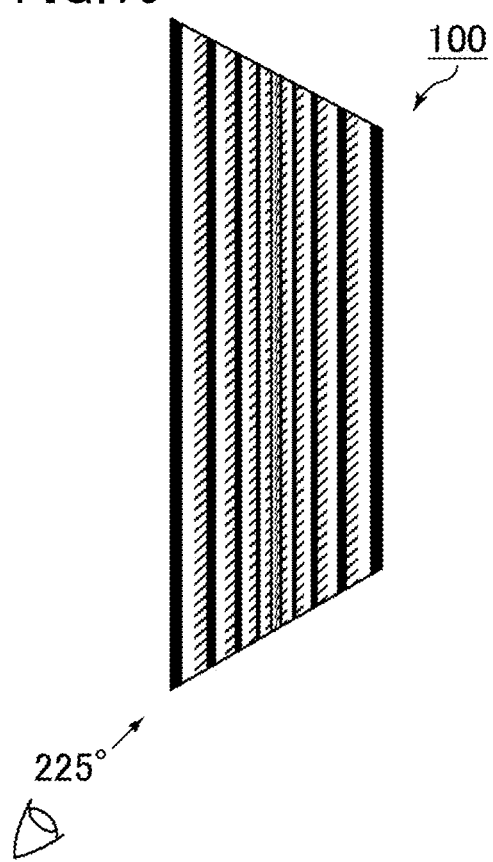
FIG. 19 is a schematic view of a display screen of a liquid crystal panel observed at an azimuth of 225°.
Figure 20:
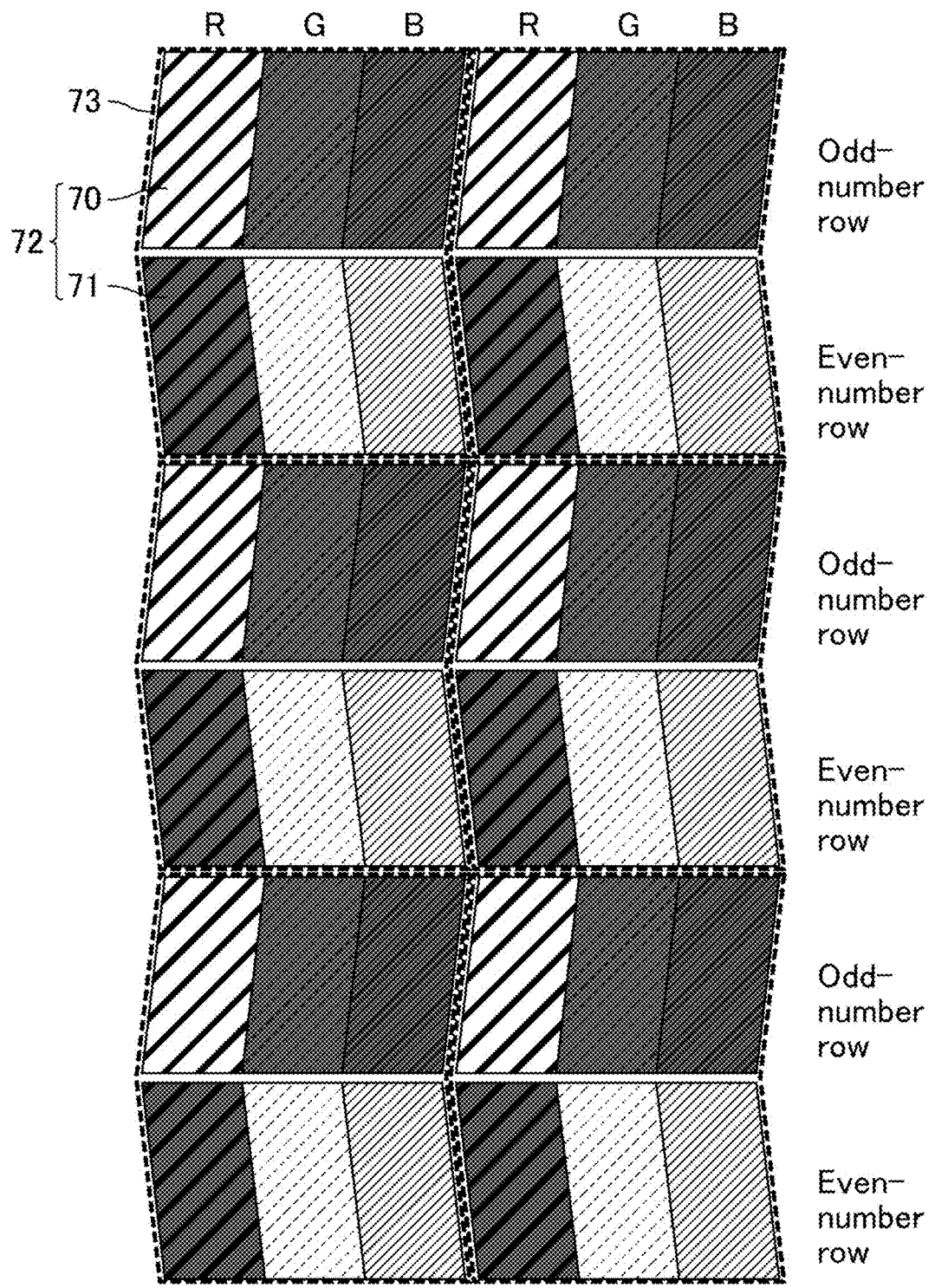
FIG. 20 is a schematic plan view of a liquid crystal panel, showing arrangement of color elements of a portion for displaying cyan stripes shown in FIG. 19.
Figure 21:
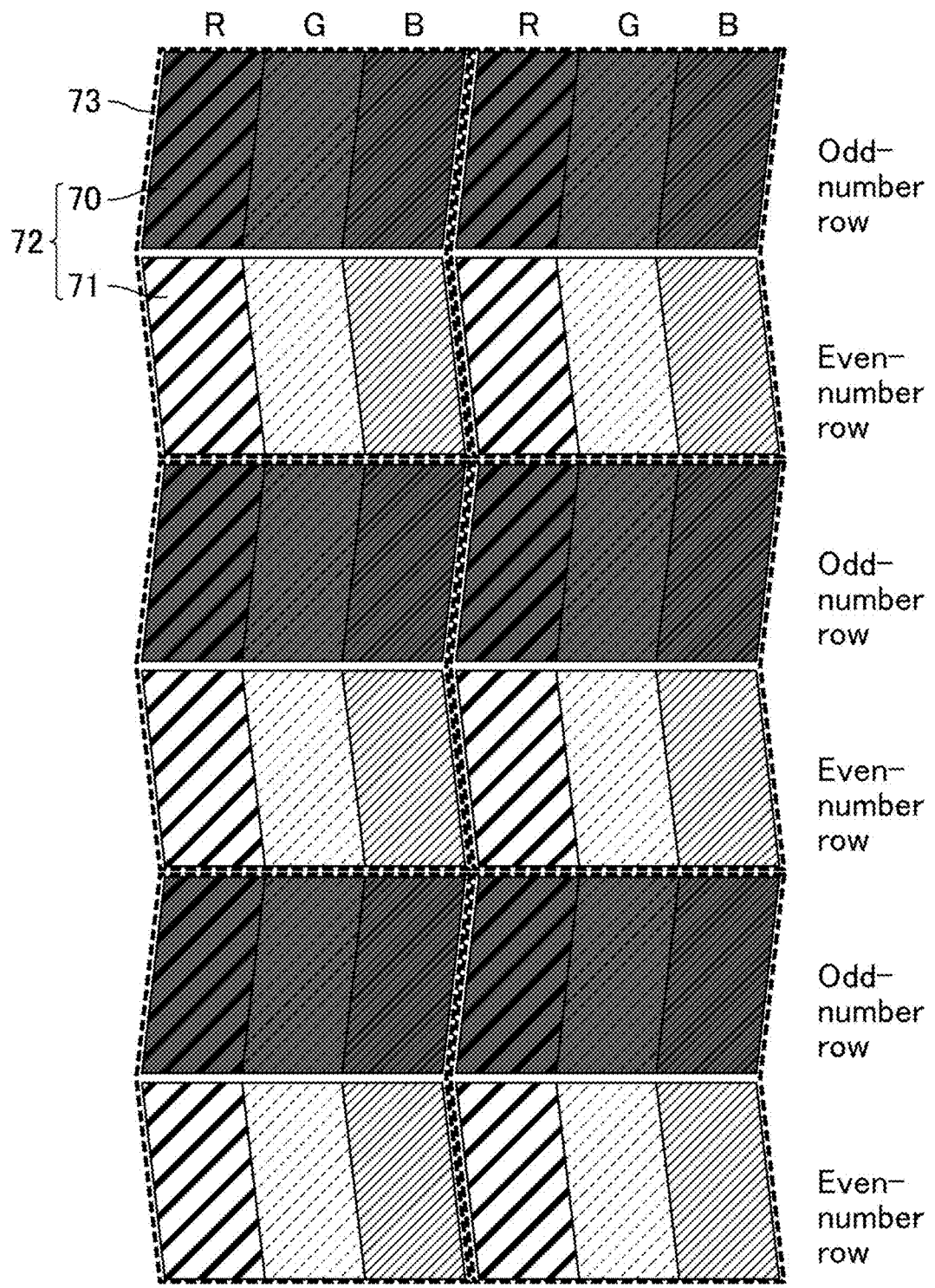
FIG. 21 is a schematic plan view of a liquid crystal panel, showing arrangement of color elements of a portion for displaying white stripes shown in FIG. 19.
Figure 22:
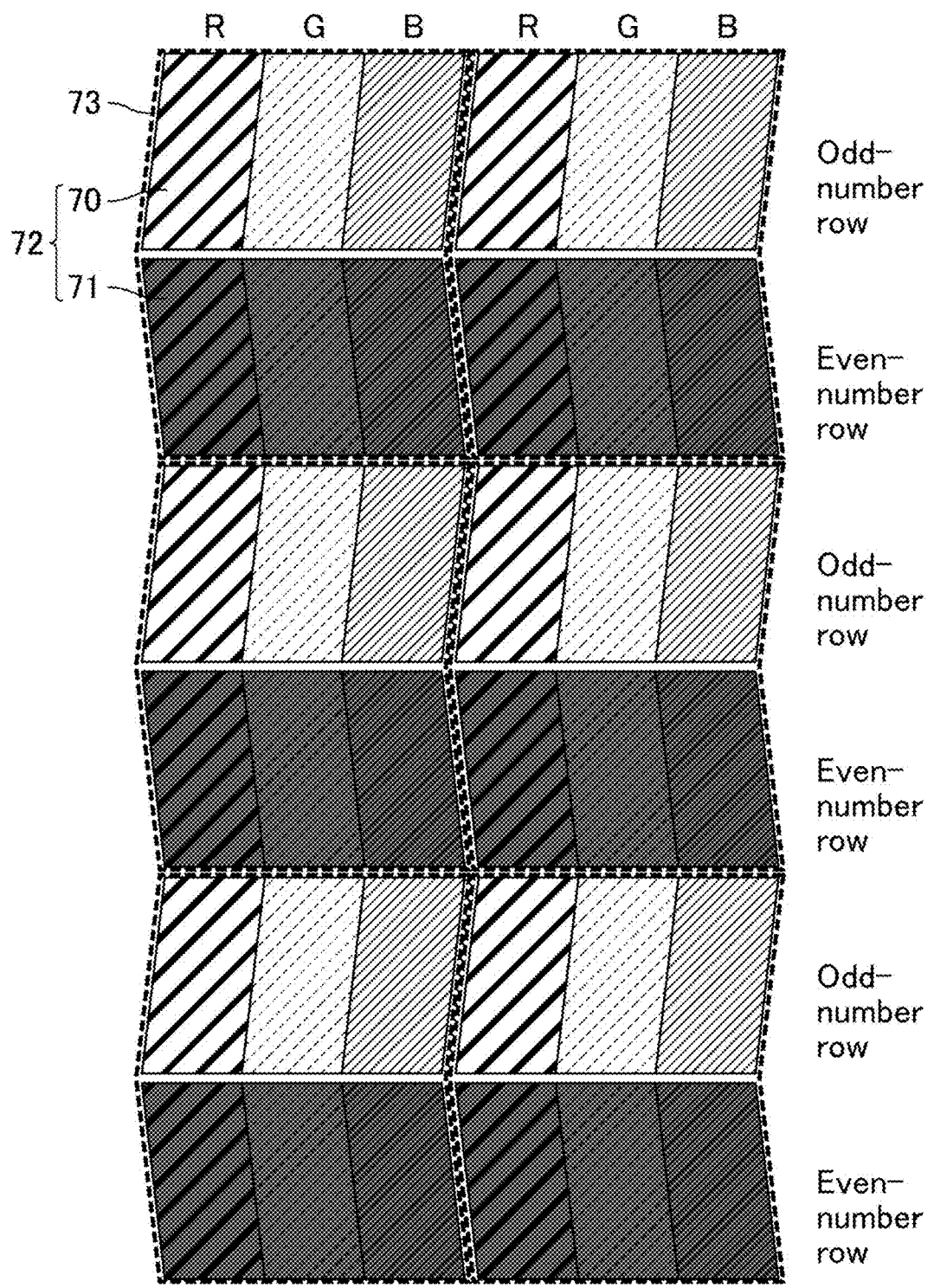
FIG. 22 is a schematic plan view of a liquid crystal panel, showing arrangement of color elements of a portion for displaying black stripes shown in FIG. 19.

The veil-view pattern is not limited, and may be a geometric pattern such as a striped pattern or a checkered pattern, characters, or an image. The case of displaying a striped pattern as the veil-view pattern is described below with reference to FIG. 18 to FIG. 22. FIG. 20 to FIG. 22 schematically show the first sub-pixel 70 and the second sub-pixel 71 shown in FIG. 1.

Figure 18:
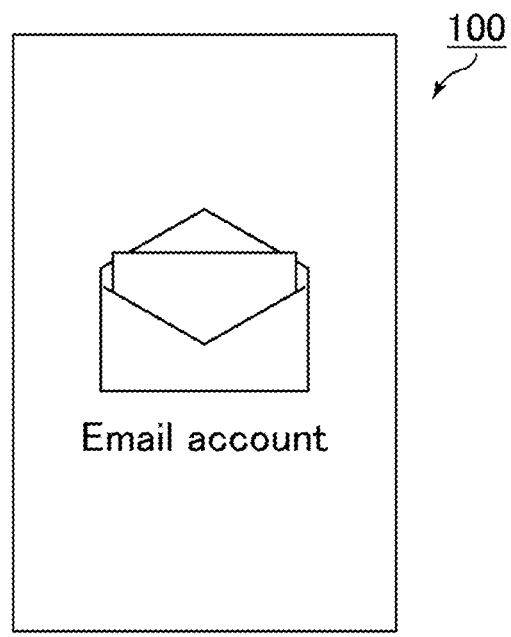
FIG. 18 is a schematic view of a display screen of a liquid crystal panel observed from the normal direction.

FIG. 18 is a schematic view of a display screen of a liquid crystal panel observed from the normal direction. FIG. 19 is a schematic view of a display screen of a liquid crystal panel observed at an azimuth of 225°. When the display screen of the liquid crystal panel is observed from the normal direction, an envelope image and the characters "Email account" are perceived as the first image as shown in FIG. 18. When the display screen of the liquid crystal panel is observed at an azimuth of 225°, a striped pattern as shown in FIG. 19 is perceived as the veil-view pattern on the first image. This makes the first image less perceivable from oblique directions, enhancing the privacy. The striped pattern is perceived as, for example, stripes of cyan, white, and black in observation at an azimuth of 225° and stripes of red, black, and white in observation at an azimuth of 315°.

FIG. 20 is a schematic plan view of a liquid crystal panel, showing arrangement of color elements of a portion for displaying cyan stripes shown in FIG. 19. As shown in FIG. 20, color elements 73 are arranged in the row and column directions of the liquid crystal panel, with the first red sub-pixels 70R, the second green sub-pixels 71G, and the second blue sub-pixels 71B displayed normally and the second red sub-pixels 71R, the first green sub-pixels 70G, and the first blue sub-pixels 70B displayed in black. With this arrangement, the liquid crystal display device can display cyan stripes as the veil-view pattern in observation at an azimuth of 225° and red stripes as the second image in observation at an azimuth of 315°. The normal display is display for the first image.

FIG. 21 is a schematic plan view of a liquid crystal panel, showing arrangement of color elements of a portion for displaying white stripes shown in FIG. 19. For white stripes, as shown in FIG. 21, the color elements 73 are arranged in the row and column directions of the liquid crystal panel, with the first red sub-pixels 70R, the first green sub-pixels 70G, and the first blue sub-pixels 70B displayed in black and the second red sub-pixels 71R, the second green sub-pixels 71G, and the second blue sub-pixels 71B displayed normally. With this arrangement, the liquid crystal display device can display white stripes in observation at an azimuth of 225° and black stripes in observation at an azimuth of 315°.

FIG. 22 is a schematic plan view of a liquid crystal panel, showing arrangement of color elements of a portion for displaying black stripes shown in FIG. 19. For black stripes, as shown in FIG. 22, the color elements 73 are arranged in the row and column directions of the liquid crystal panel, with the first red sub-pixels 70R, the first green sub-pixels 70G, and the first blue sub-pixels 70B displayed normally and the second red sub-pixels 71R, the second green sub-pixels 71G, and the second blue sub-pixels 71B displayed in black. With this arrangement, the liquid crystal display device can display black stripes in observation at an azimuth of 225° and white stripes in observation at an azimuth of 315°.

Figure 23:
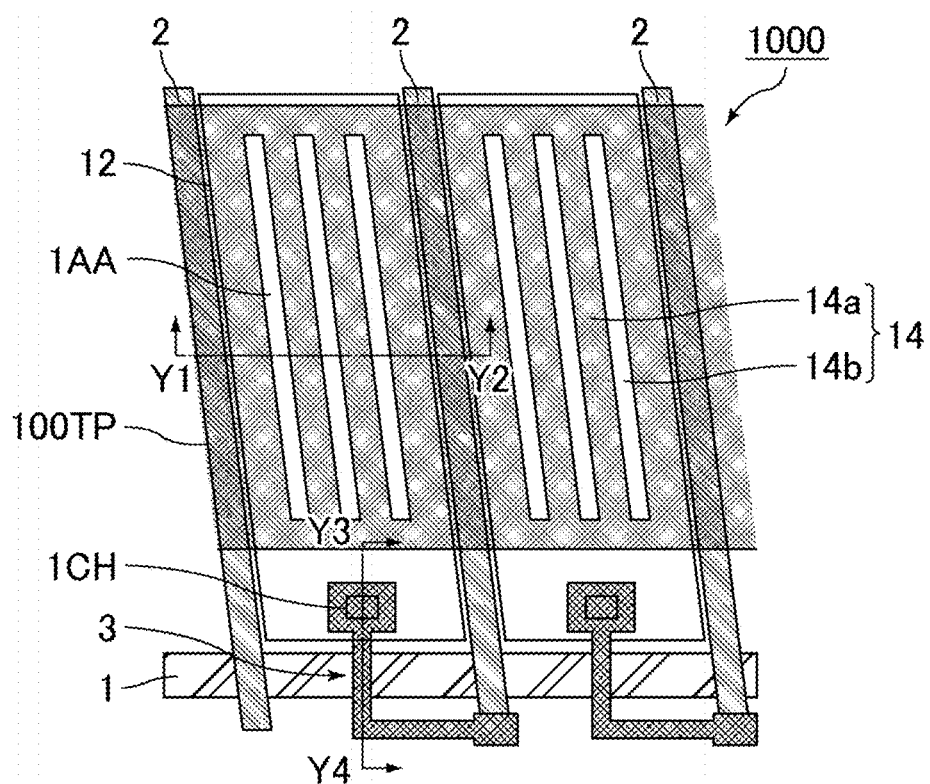
FIG. 23 is a schematic plan view of an example of a liquid crystal display device of Embodiment 1, including an in-cell touch panel.
Figure 24:
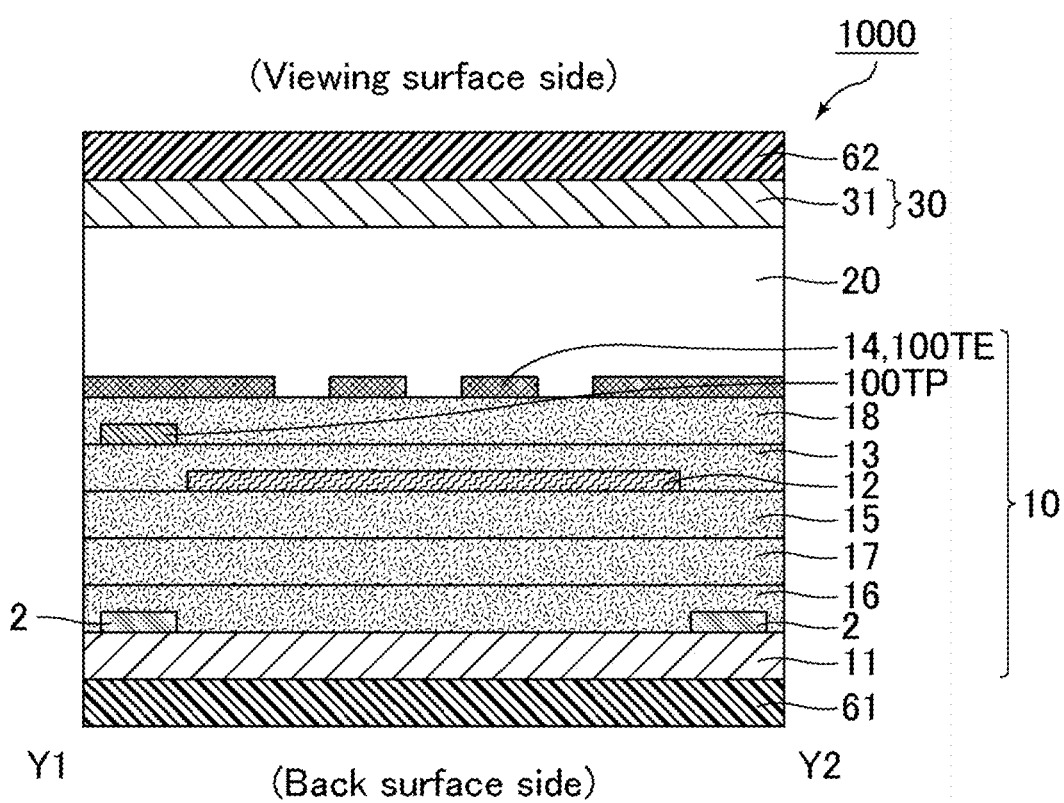
FIG. 24 is a schematic cross-sectional view taken along line Y1-Y2 in FIG. 23.
Figure 25:
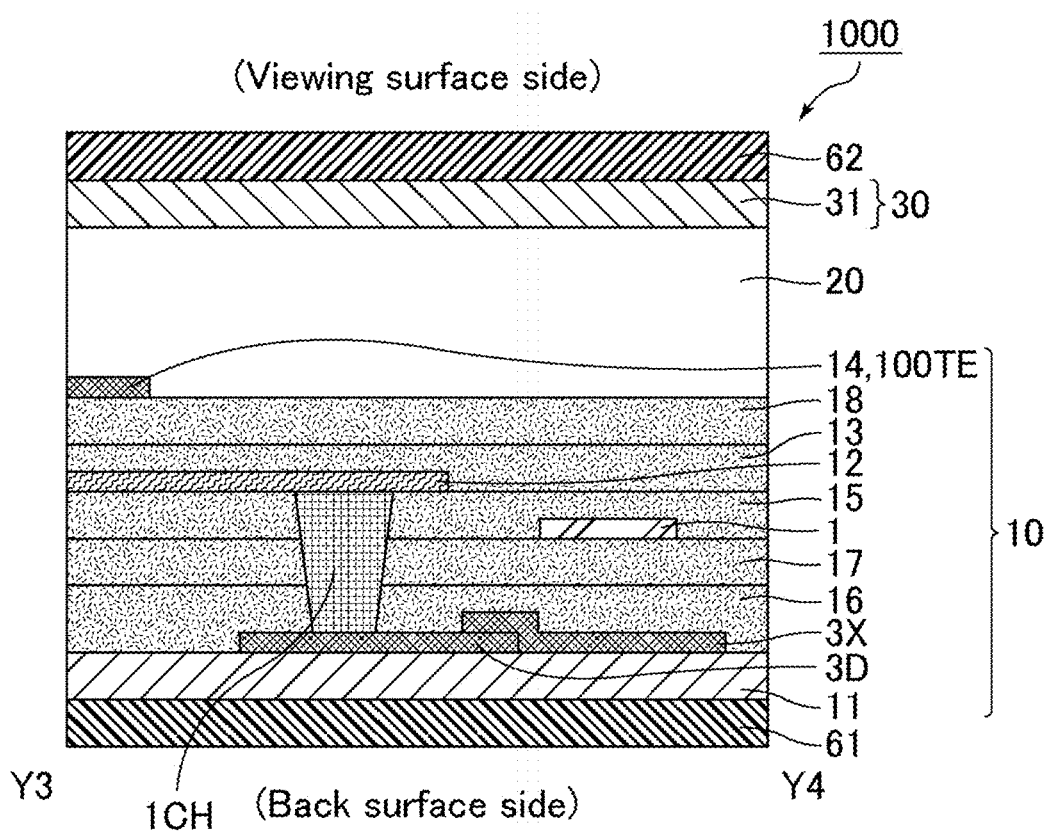
FIG. 25 is a schematic cross-sectional view taken along line Y3-Y4 in FIG. 23.

The case where an in-cell touch panel is mounted on the liquid crystal display device 1000 of the present embodiment is described. FIG. 23 is a schematic plan view of an example of a liquid crystal display device of Embodiment 1, including an in-cell touch panel. FIG. 24 is a schematic cross-sectional view taken along line Y1-Y2 in FIG. 23. FIG. 25 is a schematic cross-sectional view taken along line Y3-Y4 in FIG. 23.

As shown in FIG. 23 to FIG. 25, the active matrix substrate 10 of the present embodiment sequentially includes from the back surface side toward the viewing surface side the first substrate 11, the source lines 2, a third insulating layer 16, a fourth insulating layer 17, the second insulating layer 15, the first electrodes 12, the first insulating layer 13, touch panel lines 100TP, a fifth insulating layer 18, and the second electrodes 14 also functioning as touch panel electrodes 100TE.

Examples of the third insulating layer 16, the fourth insulating layer 17, and the fifth insulating layer 18 include inorganic insulating films and organic insulating films. Examples of the inorganic insulating films include inorganic films (relative dielectric constant ε=5 to 7) such as a film of silicon nitride (SiNx) and a film of silicone oxide (SiO$_2$) and a multiplayer film of any of these. Examples of the organic insulating films include organic films such as a film of acryl resin, polyimide resin, or novolac resin and a stack of any of these.

The active matrix substrate 10 includes the touch panel lines 100TP on the side closer to the liquid crystal layer 20 of the first substrate 11. Such a structure can provide a touch panel function while reducing the thickness of the liquid crystal display device. The touch panel lines 100TP are superimposed with the source lines 2 via an insulating layer in a display region 1AA, for example. The display region 1AA is a region for displaying an image.

When the liquid crystal display device 1000 includes a self-capacitance in-cell touch panel, the display region 1AA includes the touch panel electrodes 100TE and the touch panel lines 100TP. The touch panel electrodes 100TE are arranged in a pattern such as a tiled pattern (matrix pattern). Each of the touch panel lines 100TP is connected to one of the touch panel electrodes 100TE. The touch panel lines 100TP are also connected to a source driver.

Each touch panel electrode 100TE is a division electrode of a second electrode 14 as a common electrode. During the period in which a display signal, which is a signal for display, is written in each pixel, the electrode is set to have a pixel-standard potential (common voltage) so as to work as a common electrode, while during a sensing period in which no display signal is written (no gate scanning is performed), the electrode functions as the touch panel electrode 100TE. Each touch panel electrode 100TE is connected to one touch panel line 100TP, and during the sensing period, a signal for sensing is input from the source driver to the touch panel electrode 100TE via the touch panel line 100TP. An example of the signal for sensing is a touch signal being a pulse signal that is applied for detecting the change in capacitance in the touch panel electrode 100TE. During the sensing period, a touch signal is applied to the touch panel electrode 100TE via the touch panel line 100TP. Then, the change in capacitance is detected by a driver, whereby the presence or absence of contact and/or approach of a pointer can be detected.

As shown in FIG. 25, each TFT 3 is connected to a corresponding gate line 1 and source line 2 among the multiple gate lines 1 and multiple source lines 2 and is a three-terminal switch including a gate electrode protruding from the corresponding gate line 1 (being part of the corresponding gate line 1), a source electrode protruding from the corresponding source line 2 (part of the corresponding source line 2), a drain electrode 3D connected to the corresponding first electrode 12 of the multiple first electrodes 12 functioning as a pixel electrode, and a thin-film semiconductor layer 3X. The source electrode and the drain electrode 3D are formed in a source line layer including the source lines 2, and the gate electrodes are formed in a gate line layer including the gate lines 1. Each first electrode 12 is connected to the drain electrode 3D via the second insulating layer, the fourth insulating layer 17, and a contact hole 1CH formed in the third insulating layer 16.

The thin-film semiconductor layer 3X of each TFT 3 is formed from, for example, a high-resistant semiconductor layer containing a component such as amorphous silicon or polysilicon, and a low-resistant semiconductor layer containing a component such as n+ amorphous silicon in which amorphous silicon is doped with an impurity such as phosphorus. The thin-film semiconductor layer 3X may be an oxide semiconductor layer containing zinc oxide or the like. An example of the material for the oxide semiconductor layer is indium gallium zinc oxide (IGZO).

Embodiment 2

In the present embodiment, features unique to the present embodiment are mainly described, and descriptions for the points similar to Embodiment 1 are omitted. The present embodiment is substantially the same as Embodiment 1 except for the arrangement of the linear electrodes 341.

Figure 26:
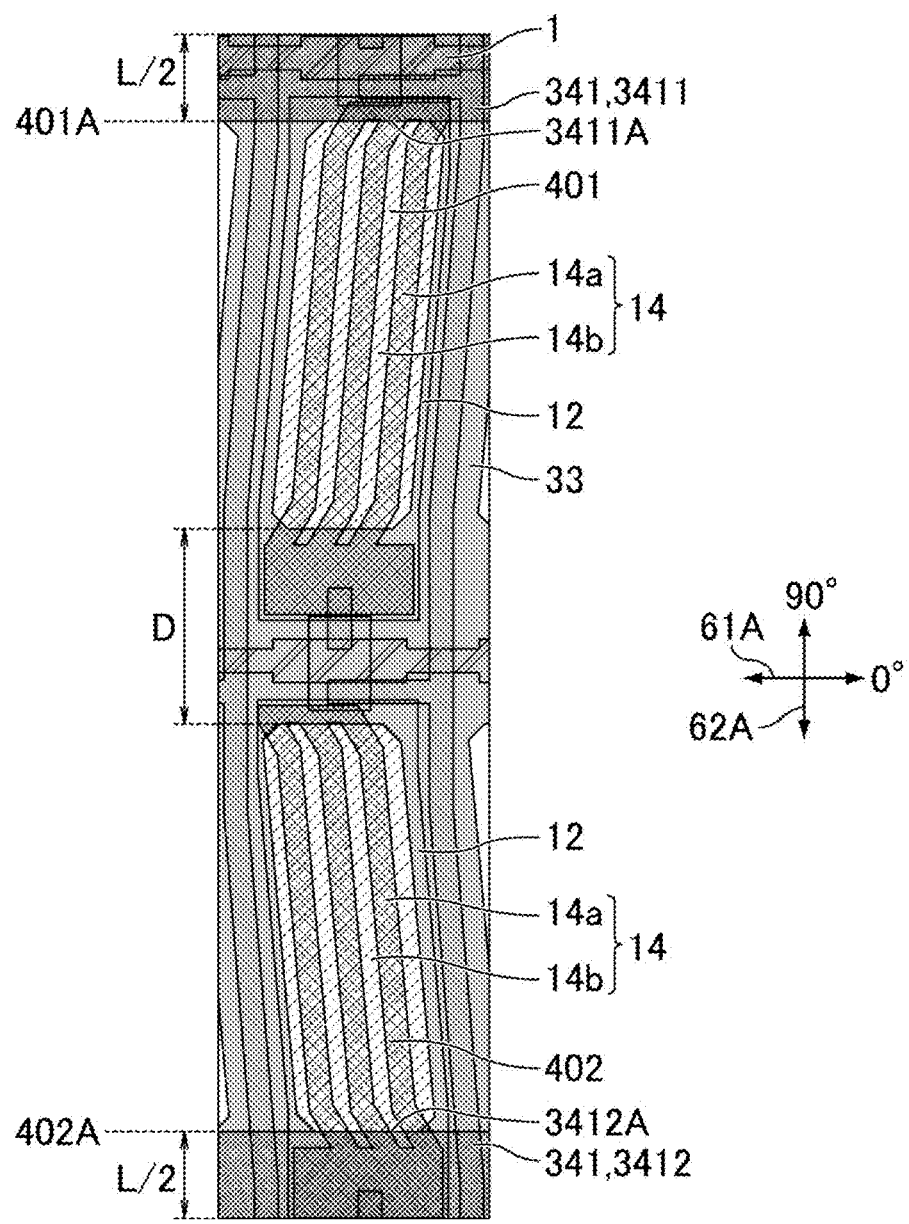
FIG. 26 is a schematic plan view showing arrangement of first electrodes, second electrodes, and a third electrode in two sub-pixels of a liquid crystal display device of Embodiment 2.

FIG. 26 is a schematic plan view showing arrangement of first electrodes, second electrodes, and a third electrode in two sub-pixels of a liquid crystal display device of Embodiment 2. As shown in FIG. 26, the third electrode 34 of the present embodiment includes two linear electrodes 341 (linear electrodes 3411 and 3412) and satisfies that, in the direction perpendicular to the extending direction of the gate lines 1, the distance between an optical opening 401 adjacent to an optical opening 402 in the direction perpendicular to the extending direction of the gate lines 1 and the linear electrode 3411 as one of the two linear electrodes 3411 and 3412 is less than D/4, and the distance between the optical opening 402 as the other optical opening and the linear electrode 3412 as the other linear electrode is less than D/4, wherein the distance between the two adjacent optical openings 401 and 402 is defined as D. Such a structure can effectively generate a tilted vertical electric field with respect to the liquid crystal layer 20 and thus can reduce the oblique contrast ratio while increasing the front contrast ratio in the narrow viewing angle mode.

Also, the two linear electrodes 3411 and 3412 are not disposed between the two optical openings 401 and 402. Here, when an in-cell touch panel is mounted on the liquid crystal display device, a capacitance between a finger and a touch electrode is acquired only from the openings of the third electrode. Fortunately, the structure of the present invention (present embodiment) in which the two linear electrodes 3411 and 3412 are not disposed between the two optical openings allows easier acquirement of a capacitance between a finger and a touch electrode than in the case of including linear electrodes between the two optical openings 401 and 402. As a result, a highly sensitive touch function can be achieved even in the case of providing display in the narrow viewing angle mode (privacy mode).

Preferably, the two linear electrodes 3411 and 3412 are not superimposed with the optical openings 401 and 402, respectively, and an end 3411A of the linear electrode 3411 is superimposed with an end 401A of the optical opening 401 and an end 3412A of the linear electrode 3412 is superimposed with an end 402A of the optical opening 402. Such a structure allows the linear electrode 341 to be disposed closer to the optical openings 40, allows an oblique electric field to effectively act in the thickness direction of the liquid crystal layer 20, and thereby tends to achieve a narrow viewing angle.

The width L of each linear electrode 341 is D or less, for example. More preferably, the width L of each linear electrode 341 is D/4 or less. Such a structure allows easier acquirement of a capacitance between a finger and a touch electrode than in the case of including linear electrodes with a wider width. As a result, a more highly sensitive touch function can be achieved even in the case of providing display in the narrow viewing angle mode (privacy mode).

Preferably, the width L of each linear electrode 341 is D/8 or more. Such a structure can reduce or prevent signal delay when voltage is applied to the third electrode 34. In addition, when voltage is applied to the third electrode 34, an oblique electric field can effectively act in the thickness direction of the liquid crystal layer 20, which more tends to achieve a narrow viewing angle.

Embodiment 3

In the present embodiment, features unique to the present embodiment are mainly described, and descriptions for the points similar to Embodiment 1 are omitted. The present embodiment is substantially the same as Embodiment 2 except for including an island electrode not electrically connected to the linear electrodes 341 in the layer including the linear electrodes 341.

Figure 27:
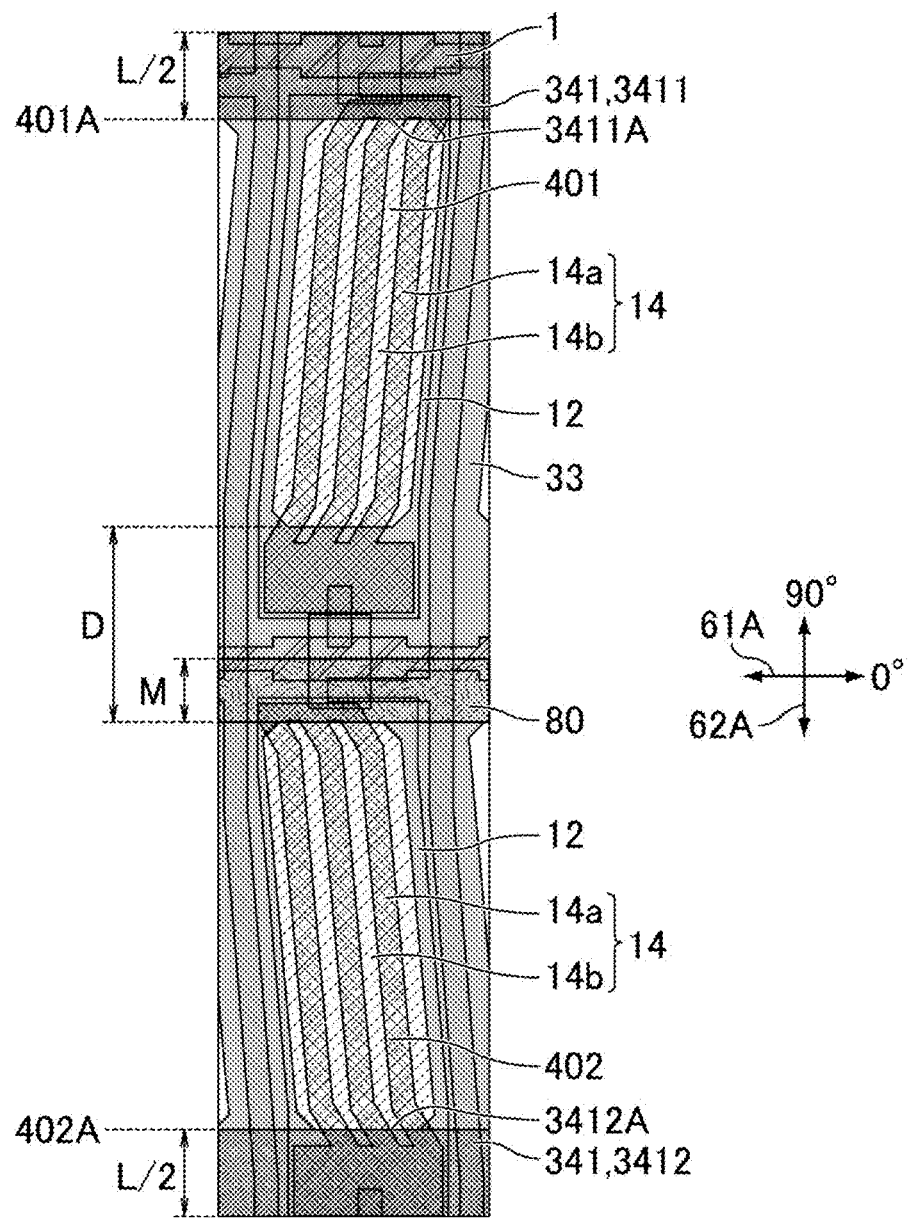
FIG. 27 is a schematic plan view showing arrangement of first electrodes, second electrodes, a third electrode, and an island electrode in two sub-pixels of a liquid crystal display device of Embodiment 3.

FIG. 27 is a schematic plan view showing arrangement of first electrodes, second electrodes, a third electrode, and an island electrode in two sub-pixels of a liquid crystal display device of Embodiment 3. The active matrix substrate 10 of the present embodiment includes the island electrode 80 not electrically connected to the linear electrodes 341 in the same layer as with the linear electrodes 341. Each island electrode 80 is not superimposed with at least a portion of each optical opening 40 in a plan view. Such a structure can achieve a more highly sensitive touch function.

For example, the island electrode 80 is disposed between the two optical openings 401 and 402 where no linear electrode 341 is disposed as shown in Embodiment 2.

Examples of the material for the island electrode 80 include the same as those for the third electrode 34.

The island electrode 80 is disposed preferably in the range where the distance from the end 40A of the optical opening 40 is D or less, more preferably in the range where the distance is D/2 or less, in the direction perpendicular to the extending direction of the gate lines 1. Such a structure can improve the signal proportion of the touch panel.

The island electrodes 80 are disposed along the gate lines 1, for example. Examples of the shape of the island electrodes 80 include linear, curved, and zig-zag shapes. Preferably, the island electrodes 80 are superimposed with the gate lines 1, for example. Such a structure can further increase the transmittance.

The island electrodes 80 may be or may not be superimposed with the optical openings 40, and are preferably not superimposed therewith. Such a structure can further increase the transmittance.

Preferably, the island electrodes 80 each have a width M in the direction perpendicular to the extending direction of the gate lines 1 is D or less, for example. Such a structure can improve the signal proportion of the touch panel.

Preferably, the width M of each island electrode 80 is D/8 or more. Such a structure can improve the signal proportion of the touch panel.

Hereinafter, the effects of the present invention are described based on examples and comparative examples. The examples, however, are not intended to limit the scope of the present invention.

Example 1

Figure 28:
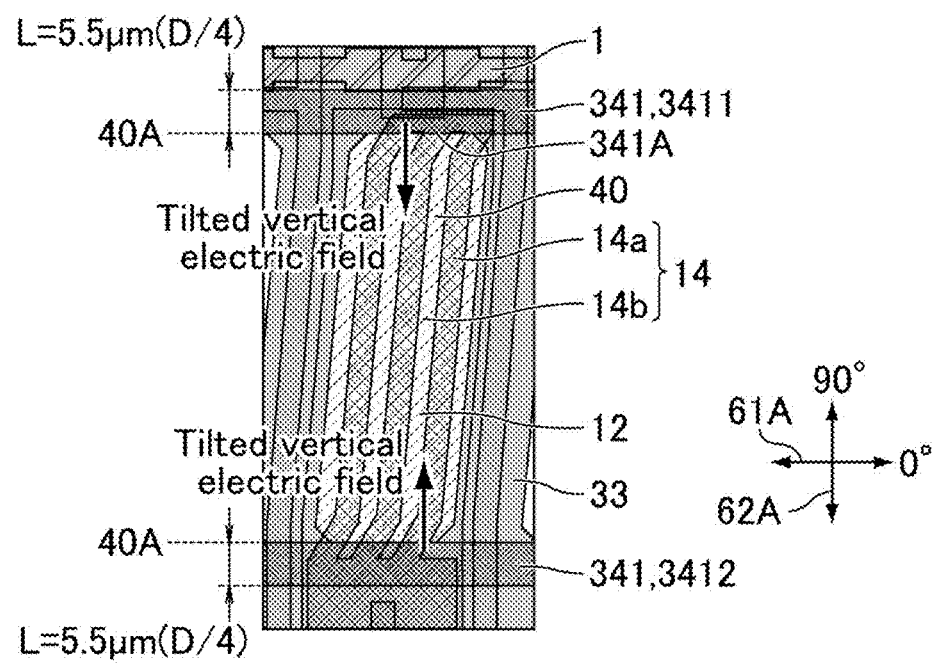
FIG. 28 is a schematic plan view showing arrangement of a first electrode, a second electrode, and a third electrode in one sub-pixel of a liquid crystal display device of Example 1.

FIG. 28 is a schematic plan view showing arrangement of a first electrode, a second electrode, and a third electrode in one sub-pixel of a liquid crystal display device of Example 1. In Example 1, a simulation was performed using simulation software (LCD master 3D available from Shintec Co., Ltd.). The liquid crystal display device of Example 1 had a structure shown in FIG. 1 to FIG. 3 and FIG. 28. FIG. 1 to FIG. 3 are each also a schematic view of the liquid crystal display device of Example 1.

The liquid crystal display device of Example 1 sequentially included the first polarizer 61, the active matrix substrate 10, the first alignment film 41, the liquid crystal layer 20, the second alignment film 42, the counter substrate 30, and the second polarizer 62. The first alignment film 41 and the second alignment film 42 were photoalignment films and were arranged such that the directions of the alignment treatment were parallel to each other, specifically, were reversed from each other (with the directions thereof differentiated by 180°). The absorption axis 61A of the first polarizer 61 and the absorption axis 62A of the second polarizer 62 were made perpendicular to each other. A backlight was disposed on the back surface side (side closer to the first polarizer 61) of the liquid crystal panel 100.

The active matrix substrate 10 sequentially included a glass substrate as the first substrate 11, the first electrodes 12, a silicon nitride film as the first insulating layer 13, and the second electrodes 14. The first electrodes 12 and the second electrodes 14 as a whole had an FFS electrode structure. Each sub-pixel had a size of 60.55 μm in length and 20.2 μm in width. As shown in FIG. 3, the first electrodes 12 were solid electrodes disposed for the respective sub-pixels and had a thickness of 100 nm. The second electrodes 14 were disposed for the respective sub-pixels and each included the linear electrode portions 14a. The linear electrode portions 14a each had a width L14 of 2.5 μm and were spaced with an interval S of 3 μm. The second electrodes 14 had a thickness of 100 nm. The first electrodes 12 and the second electrodes 14 were formed from ITO.

Also, the active matrix substrate 10 included touch panel lines on the side closer to the liquid crystal layer 20 of the first substrate 11, and the second electrodes 14 also had a function as the touch panel electrodes 100TE. In other words, the liquid crystal display device of Example 1 included an in-cell touch panel.

The liquid crystal layer 20 contained the liquid crystal molecules 21 having a positive anisotropy of dielectric constant ($\Delta n=0.1412$, $\Delta\varepsilon=4.9$) and had a thickness $d_1$ of 3.3 μm. The retardation $\Delta nd_1$ of the liquid crystal layer 20 was 330 nm. The first alignment film 41 and the second alignment film 42 used were each a film subjected to a parallel alignment treatment for homogeneously aligning the liquid crystal molecules with respect to the surface of the active matrix substrate 10 and the surface of the counter substrate 30. The first alignment film 41 and the second alignment film 42 used were each a strong anchoring film having an anchoring energy of $1\times10^{-3}$ J/m$^2$.

The counter substrate 30 sequentially included the second substrate 31, the color filters 32, the black matrix 33, a 2-μm-thick resin layer as the first dielectric layer 35 (overcoat layer), the third electrode 34, and a resin layer as the second dielectric layer 36. Dyes were used for the color filters 32.

In the direction perpendicular to the extending direction of the gate lines 1, the distance between each linear electrode 341 and an adjacent optical opening 40 was less than D/4, and the width of the linear electrode 341 was D/4 or less. Specifically, the distance D between the two optical openings 40 adjacent in the direction perpendicular to the extending direction of the gate lines 1 was set to 22 μm, and as shown in FIG. 28, the end 341A of each linear electrode 341 was set to be superimposed with the corresponding end 40A of the optical opening 40, i.e., the distance between each linear electrode 341 and an adjacent optical opening 40 was set to be 0 μm. Also, the width L of the linear electrode 341 in the direction perpendicular to the extending direction of the gate lines 1 was set to be 5.5 μm. In other words, in Example 1, each linear electrode 341 was arranged so as not to be superimposed with an adjacent optical opening 40, and the end 341A of each linear electrode 341 was set to be superimposed with the corresponding end 40A of the adjacent optical opening 40. The thickness of the third electrode 34 was 100 nm. The third electrode 34 was formed from ITO.

The backlight used was a typical backlight that provides bilaterally symmetric luminance viewing angles and does not cause luminance change depending on the polar angle for observation of the liquid crystal panel.

Example 2

Figure 29:
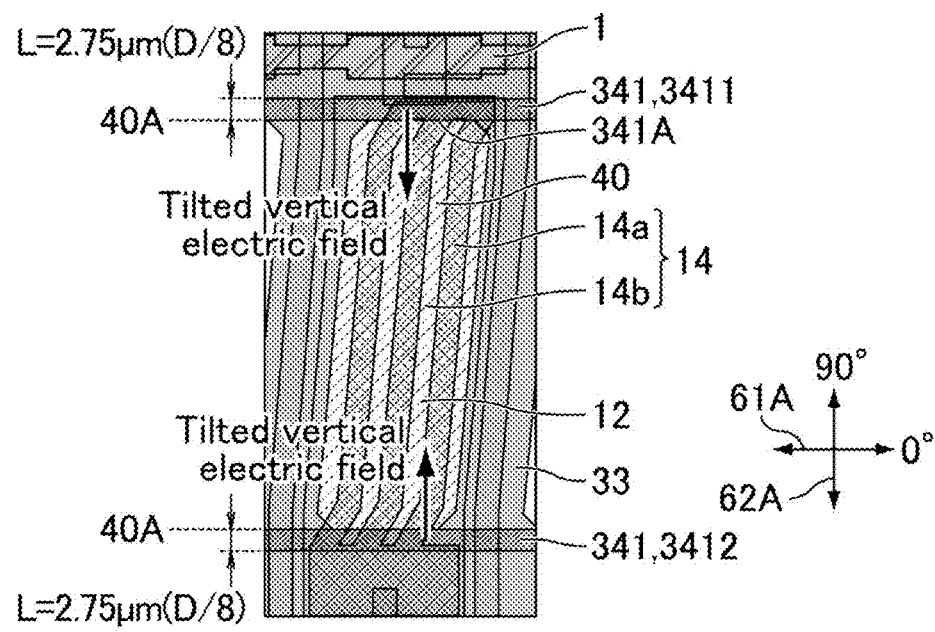
FIG. 29 is a schematic plan view showing arrangement of a first electrode, a second electrode, and a third electrode in one sub-pixel of a liquid crystal display device of Example 2.

FIG. 29 is a schematic plan view showing arrangement of a first electrode, a second electrode, and a third electrode in one sub-pixel of a liquid crystal display device of Example 2. The liquid crystal display device of Example 2 shown in FIG. 29 was produced as in Example 1, except that the width L of each linear electrode 341 in the direction perpendicular to the extending direction of the gate lines 1 was set to 2.75 μm.

Comparative Example 1

Figure 30:
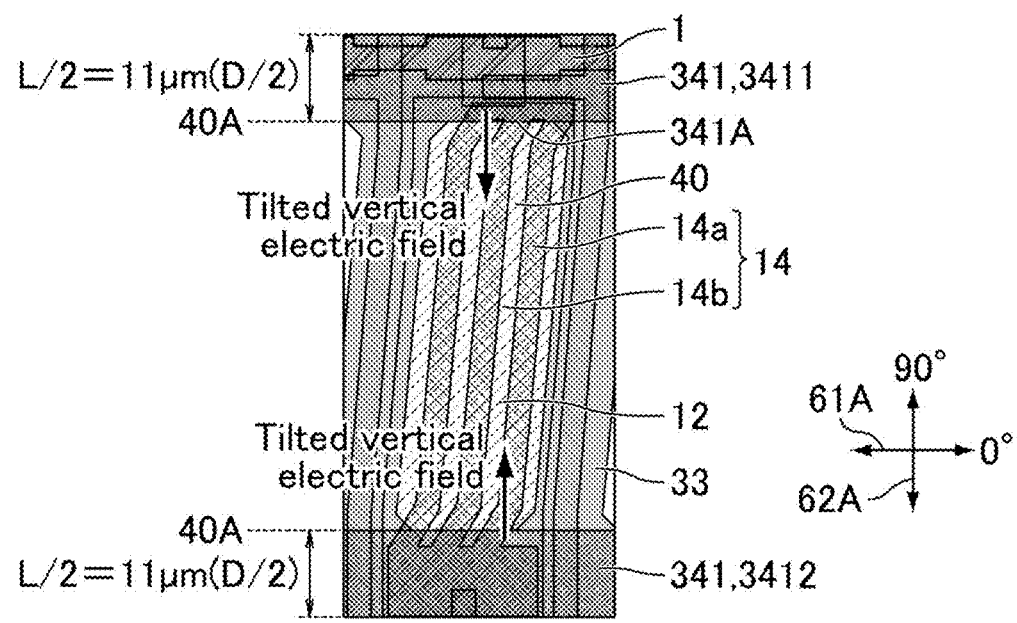
FIG. 30 is a schematic plan view showing arrangement of a first electrode, a second electrode, and a third electrode in one sub-pixel of a liquid crystal display device of Comparative Example 1.

FIG. 30 is a schematic plan view showing arrangement of a first electrode, a second electrode, and a third electrode in one sub-pixel of a liquid crystal display device of Comparative Example 1. The liquid crystal display device of Comparative Example 1 shown in FIG. 30 was produced as in Example 1, except that the width L of each linear electrode 341 in the direction perpendicular to the extending direction of the gate lines 1 was set to 22 μm. Since FIG. 30 is a schematic plan view of one sub-pixel, the linear electrodes 341 are each cut out at a border between sub-pixels in FIG. 30, and thus the linear electrodes 341 at the upper and lower ends of the sub-pixel are each shown to have a half width (L/2). The actual liquid crystal display device has a structure in which the schematic plan view of FIG. 30 is repetitively arranged in the up-down directions. Thus, the linear electrodes 341 at the upper and lower ends of the sub-pixel shown in FIG. 30 were each connected to an adjacent end thereof, i.e., each linear electrode 341 had a width L.

(Evaluation of Examples 1 and 2 and Comparative Example 1)

FIG. 31 shows the evaluation results of the front mode efficiency, front contrast ratio, contrast ratio at a 45° polar angle, and contrast ratio viewing angles of each of the liquid crystal display devices of Examples 1 and 2 and Comparative Example 1. Concerning the liquid crystal display devices of Examples 1 and 2 and Comparative Example 1, a simulation was performed for determining the front mode efficiency, front contrast ratio, contrast ratio at a 45° polar angle, and contrast ratio viewing angles, with the first electrodes set to at 0 to 6 V, the second electrodes at 0 V, and the third electrode at 6 V (counter voltage Vc=6 V), using an LCD master (available from Shintec Co., Ltd.).

Specifically, in a voltage application state of each of the liquid crystal display devices according to the examples and comparative example, the front mode efficiency was determined by calculating a maximum transmittance with the first polarizer 61 and the second polarizer 62 arranged in the crossed Nicols (hereinafter, also simply referred to as a maximum transmittance in the crossed Nicols), and the transmittance with the first polarizer 61 and the second polarizer 62 arranged in the parallel Nicols (hereinafter, also simply referred to as the transmittance in the parallel Nicols) using the LCD master, and then calculating the front mode efficiency according to the following (formula A). The front contrast ratio and contrast ratio at a 45° polar angle of each of the liquid crystal display devices of the examples and comparative example were determined by calculating the transmittance in white display and the transmittance in black display using the LCD master and dividing the transmittance in white display by the transmittance in black display. FIG. 31 shows the results.

Front mode efficiency (%)=(maximum transmittance in crossed Nicols/transmittance in parallel Nicols)×100     (formula A)

Figure 32:
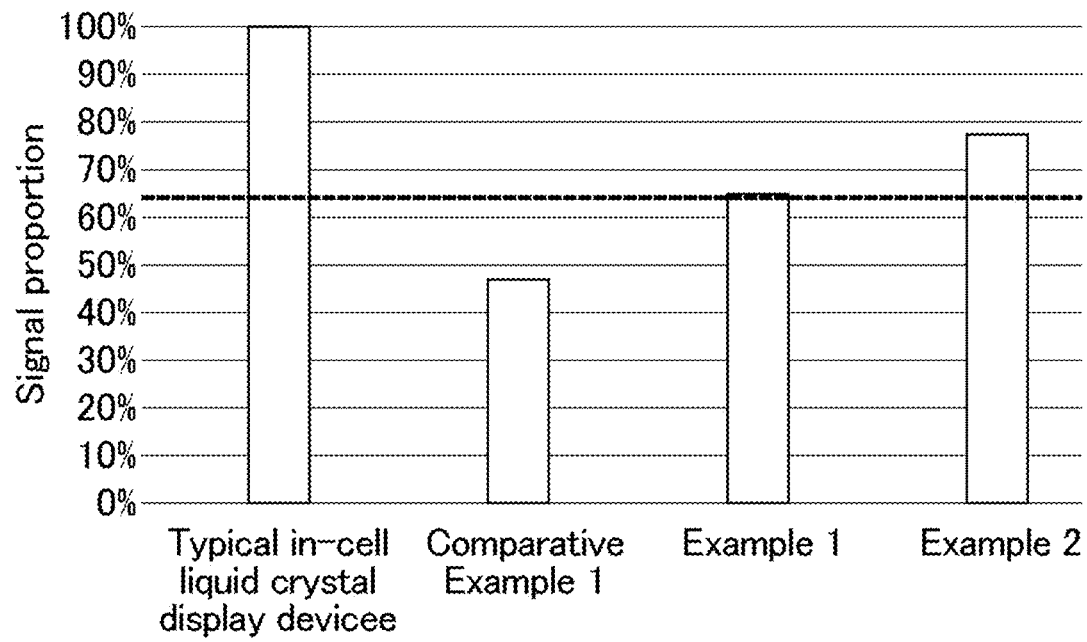
FIG. 32 shows the signal proportions of the in-cell touch panel of each of liquid crystal display devices of Example 1, Example 2, and Comparative Example 1 and a typical in-cell liquid crystal display device.

Also, the touch function of each of the liquid crystal display devices of Examples 1 and 2 and Comparative Example 1 was evaluated. Specifically, the touch function was determined by converting the amount of change in capacitance detected in each of the liquid crystal display devices of Examples 1 and 2 and Comparative Example 1 into a signal proportion, wherein the amount of change in capacitance of a typical in-cell touch panel-mounted liquid crystal display device is defined as a signal proportion of 100%, where the in-cell touch panel-mounted liquid crystal display device (also simply referred to as a typical in-cell liquid crystal display device) had the same structure as that of Example 1 except for not including the third electrode. FIG. 32 shows the results. FIG. 32 shows the signal proportions of the in-cell touch panel of each of liquid crystal display devices of Example 1, Example 2, and Comparative Example 1 and a typical in-cell liquid crystal display device.

The liquid crystal display devices of Examples 1 and 2 were each capable of switching between the wide viewing angle mode and the narrow viewing angle mode, and in the wide viewing angle mode in which the third electrode had a counter voltage Vc of 0 V, a high contrast ratio (surface contrast ratio=1200, contrast ratio at a 45° polar angle=400) was achieved.

Also, as shown in FIG. 31 and FIG. 32, in Example 1, the width of each linear electrode 341 on the side with the counter substrate 30 was thinned to be 25% of the width thereof in Comparative Example 1 and was divided into two electrodes (segmentalized (divided into two)), whereby in the narrow viewing angle mode in which the counter voltage Vc was 6 V, the device successfully had a front contrast ratio of 1144 and a contrast ratio at a 45° polar angle of 22 (similar to Comparative Example 1). Thus, the achieved signal proportion (66%) was higher than the level applicable to finger touch (65%) while the front contrast ratio was increased and the oblique contrast ratio was reduced. Accordingly, Example 1 achieved a high contrast ratio similar to Comparative Example 1 and a highly sensitive in-cell touch function.

Also, as shown in FIG. 31 and FIG. 32, in Example 2, the width of the linear electrodes 341 on the side with the counter substrate 30 was thinned to be 12.5% of the width thereof of Comparative Example 1 and were each divided into two electrodes (segmentalized (divided into two)), whereby in the narrow viewing angle mode in which the counter voltage Vc was 6 V, the device successfully had a front contrast ratio of 1139 and a contrast ratio at a 45° polar angle of 22 (similar to Comparative Example 1). Thus, the achieved signal proportion (77%) was significantly higher than the level applicable to finger touch (65%) while the front contrast ratio was increased and the oblique contrast ratio was reduced. Accordingly, Example 1 achieved a high contrast ratio similar to Comparative Example 1 and a more highly sensitive in-cell touch function.

Meanwhile, in Comparative Example 1 in which the width of the linear electrodes 341 on the side with the counter substrate 30 was made 22 μm, in the narrow viewing angle mode in which the counter voltage Vc was 6 V, the device successfully had a front contrast ratio of 1137 and a contrast ratio at a 45° polar angle of 22, which was sufficient for providing display in the privacy mode. However, Comparative Example 1 failed to obtain a signal proportion satisfying the level applicable to finger touch (65%). Accordingly, Comparative Example 1 had difficulty in achieving an in-cell touch function together with the privacy mode.

The linear electrodes 341 in each of Examples 1 and 2 and Comparative Example 1 were each in contact with an adjacent optical opening 40. Thus, when a counter voltage Vc of 6 V was applied to the linear electrodes 341, a tilted vertical electric field at a voltage similar to the counter voltage Vc acts in the optical openings 40 (resulting in a reduced oblique CR in the privacy mode). The area occupied by the linear electrodes 341 with respect to the pixels in a front view of the pixels of the examples and comparative example satisfies a relation of Example 2<Example 1<Comparative Example 1. Here, the capacitance between a touch panel electrode and a finger is reduced when an electric field-shielding layer such as an electrode is present. Thus, the touch performance was presumably in the order of Example 2 as the best, Example 1 as the second, and Comparative Example 1 as the worst.

Comparative Example 2

Figure 33:
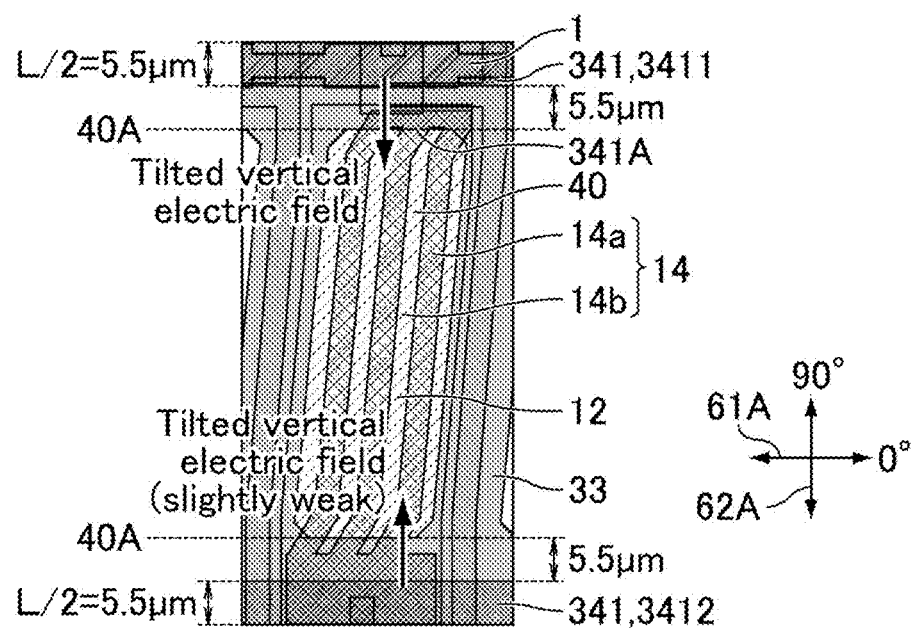
FIG. 33 is a schematic plan view showing arrangement of a first electrode, a second electrode, and a third electrode in one sub-pixel of a liquid crystal display device of Comparative Example 2.

FIG. 33 is a schematic plan view showing arrangement of a first electrode, a second electrode, and a third electrode in one sub-pixel of a liquid crystal display device of Comparative Example 2. The liquid crystal display device of Comparative Example 2 shown in FIG. 33 was produced as in Example 1 except for the arrangement of the linear electrodes 341.

In Comparative Example 2, in the direction perpendicular to the extending direction of the gate lines 1, the width L of each linear electrode 341 was set to be 11 μm, and the distance between each linear electrode 341 and an adjacent optical opening 40 was set to 5.5 μm. In the liquid crystal display device of Comparative Example 2, the area occupied by the linear electrodes 341 with respect to the pixels was able to be made small, but the linear electrodes 341 were apart from the ends 40A of the optical openings 40. Thus, the influence of the tilted vertical electric field was weakened, resulting in an increased oblique contrast ratio in the privacy mode.

Example 3

Figure 34:
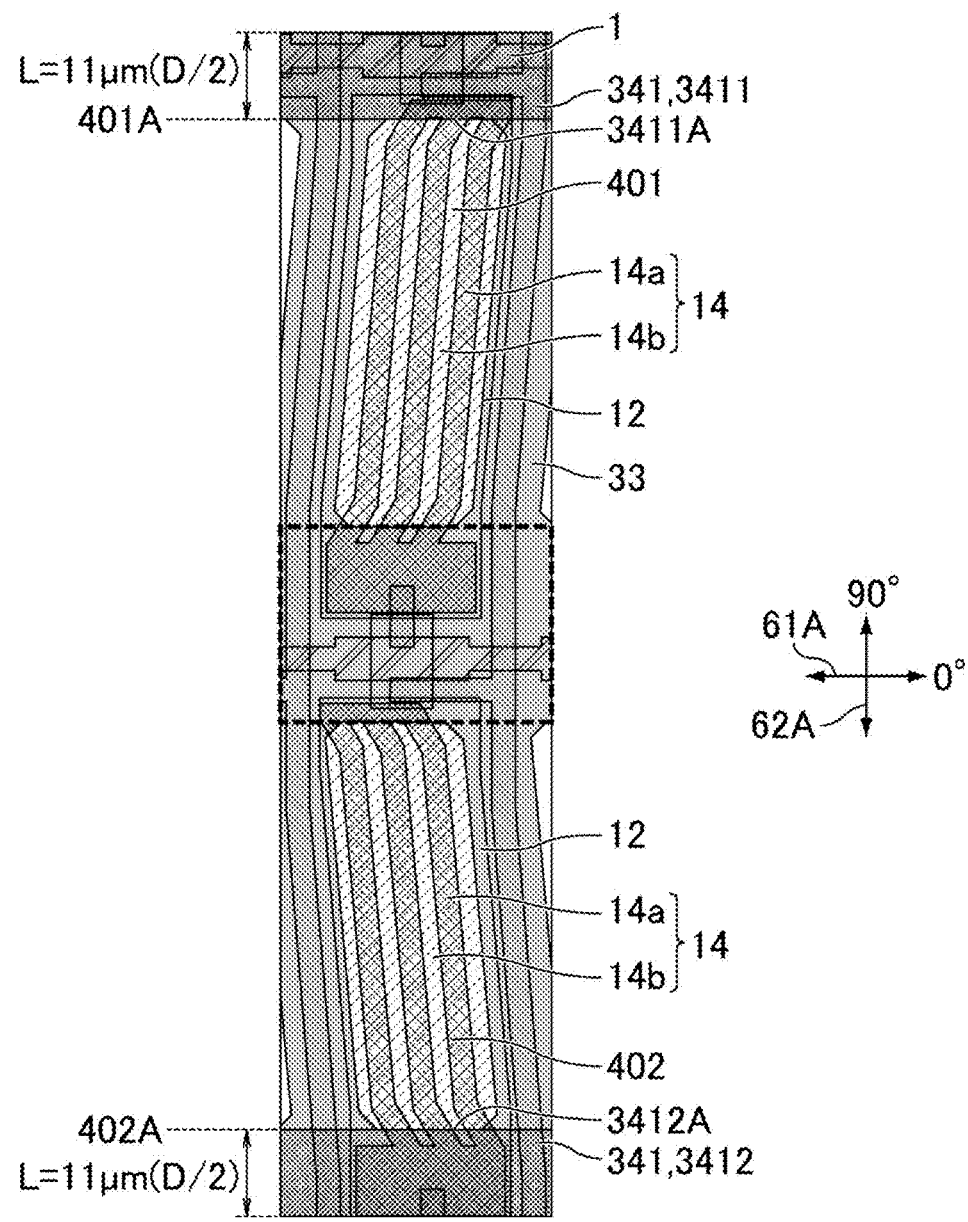
FIG. 34 is a schematic plan view showing arrangement of first electrodes, second electrodes, and a third electrode in two sub-pixels of a liquid crystal display device of Example 3.

FIG. 34 is a schematic plan view showing arrangement of a first electrode, a second electrode, and a third electrode in one sub-pixel of a liquid crystal display device of Example 3. The liquid crystal display device of Example 3 corresponding to Embodiment 2 was produced as in Example 1 except for the arrangement and the width of the linear electrodes 341. The linear electrodes of Example 3 had the structure shown in FIG. 26 and FIG. 34. In other words, the linear electrodes 341 of the present example were spaced with a two-sub-pixels interval in the vertical (column) direction. The width L of each linear electrode 341 was 22 μm.

Example 4

Figure 35:
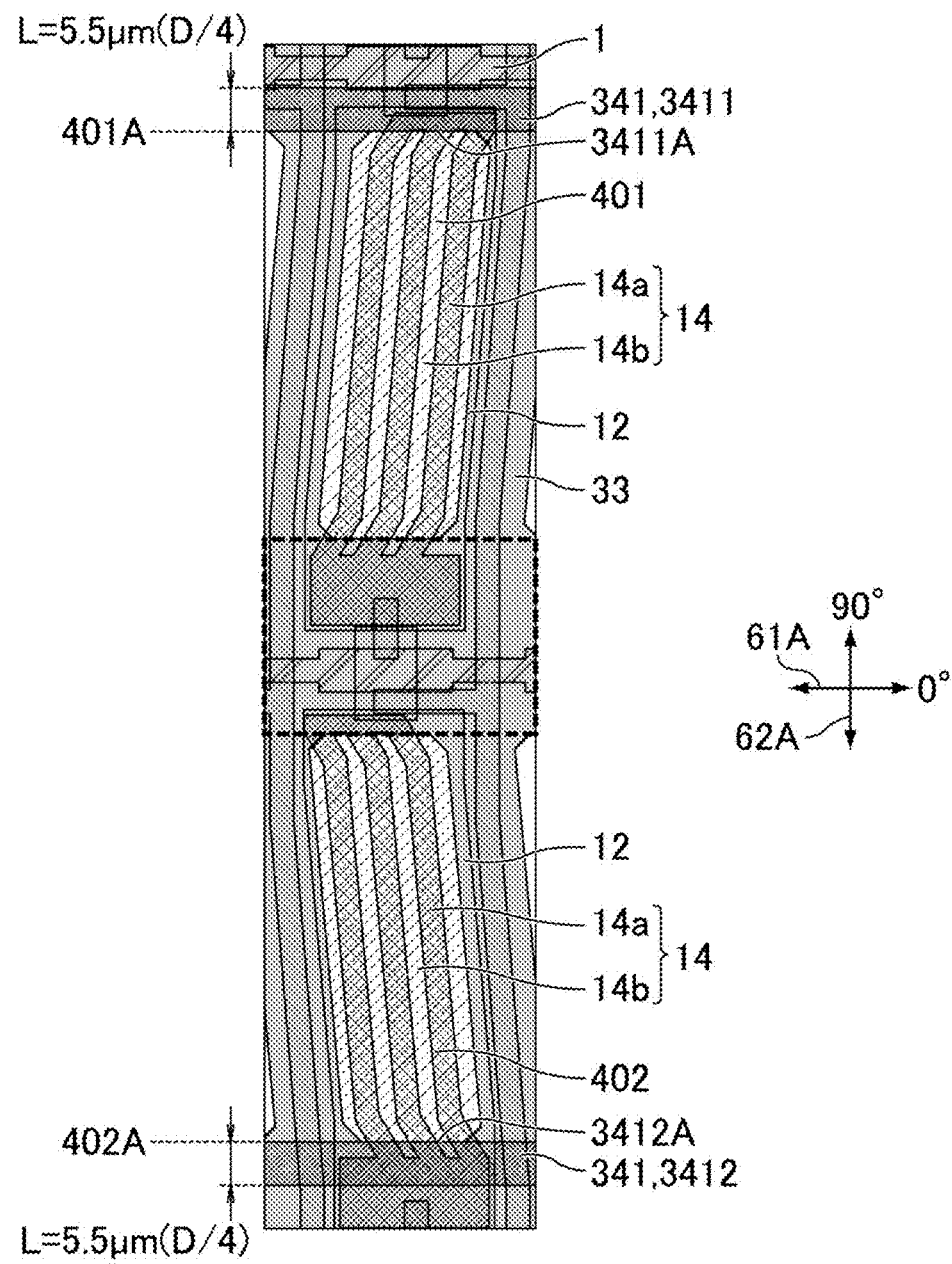
FIG. 35 is a schematic plan view showing arrangement of first electrodes, second electrodes, and a third electrode in two sub-pixels of a liquid crystal display device of Example 4.

FIG. 35 is a schematic plan view showing arrangement of a first electrode, a second electrode, and a third electrode in one sub-pixel of a liquid crystal display device of Example 4. The liquid crystal display device of Example 4 corresponding to Embodiment 2 was produced as in Example 1 except for the arrangement and the width of the linear electrodes 341. The linear electrodes of Example 4 had the structure shown in FIG. 35. In other words, the linear electrodes 341 of the present example were spaced with a two-sub-pixels interval in the vertical (column) direction. The width L of each linear electrode 341 was 5.5 μm.

Comparative Example 3

Figure 36:
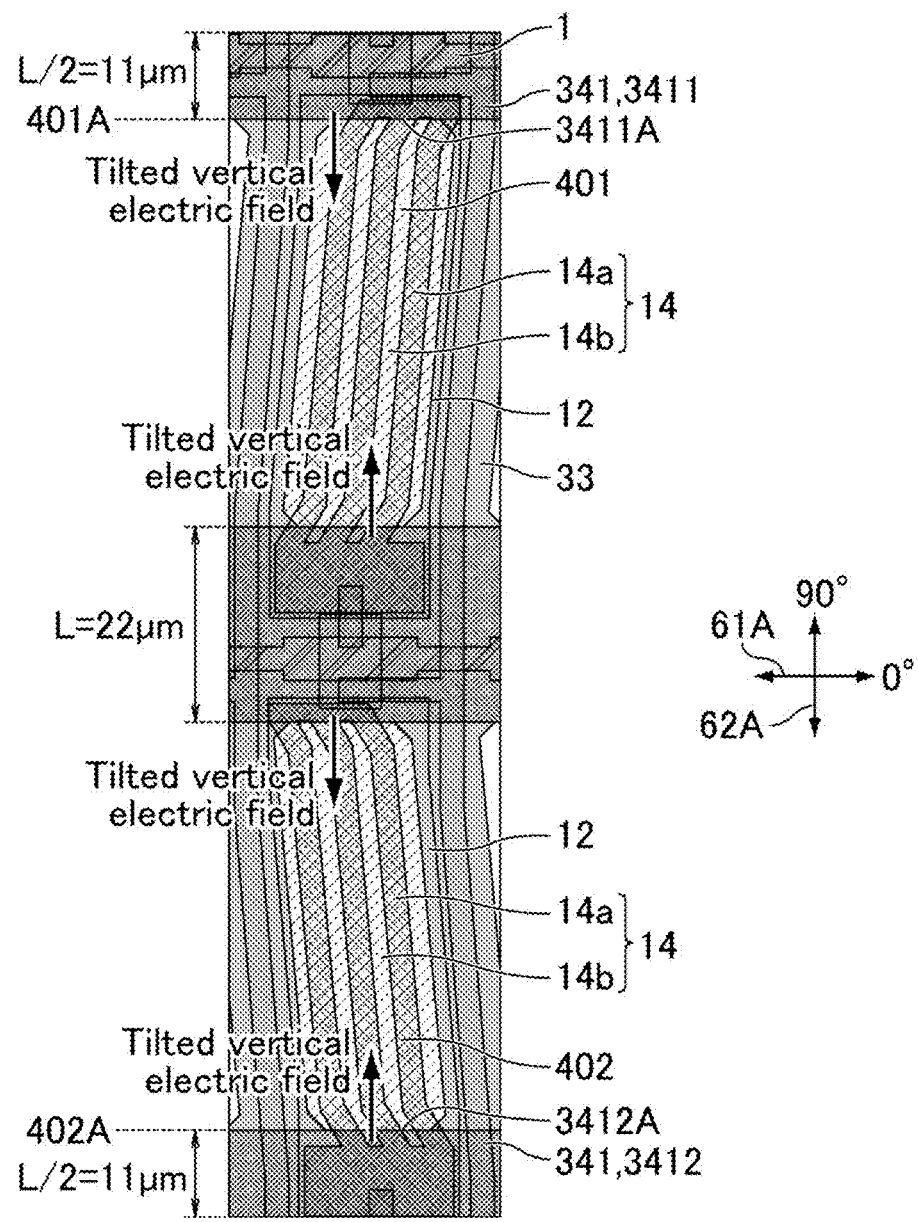
FIG. 36 is a schematic plan view showing arrangement of first electrodes, second electrodes, and a third electrode in two sub-pixels of a liquid crystal display device of Comparative Example 3.

FIG. 36 is a schematic plan view showing arrangement of first electrodes, second electrodes, and a third electrode in two sub-pixels of a liquid crystal display device of Comparative Example 3. In Comparative Example 1, a simulation was performed for one sub-pixel. In Comparative Example 3, as shown in FIG. 34, a simulation was performed for two sub-pixels each having the same structure as that of Comparative Example 1. In other words, the linear electrode 341 in the present comparative example was disposed in every portion between the optical openings 40 in the direction perpendicular to the gate lines 1. The width L of each linear electrode 341 was 22 μm.

Comparative Example 4

Figure 37:
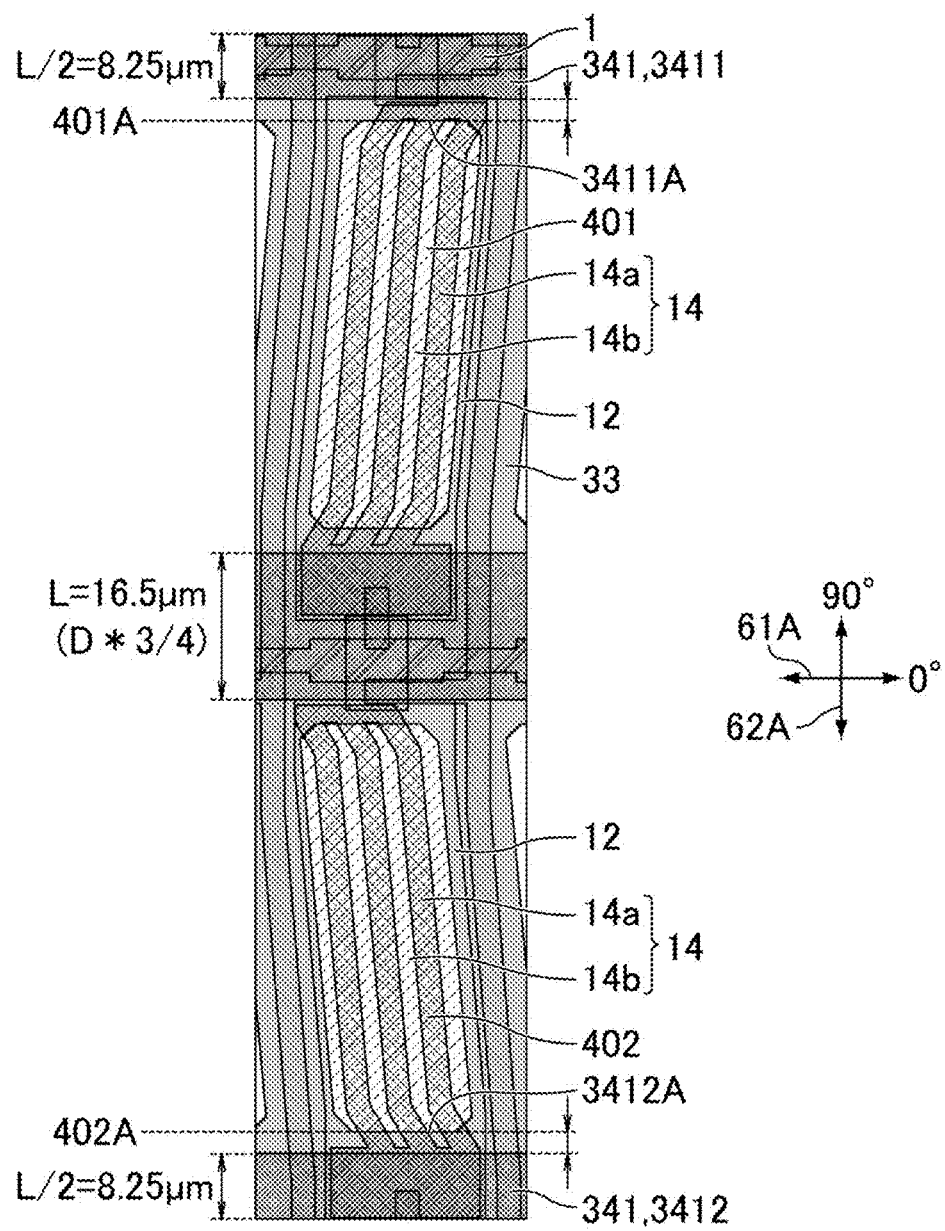
FIG. 37 is a schematic plan view showing arrangement of first electrodes, second electrodes, and a third electrode in two sub-pixels of a liquid crystal display device of Comparative Example 4.

FIG. 37 is a schematic plan view showing arrangement of first electrodes, second electrodes, and a third electrode in two sub-pixels of a liquid crystal display device of Comparative Example 4. As shown in FIG. 37, the liquid crystal display device of Comparative Example 4 was produced as in Comparative Example 3, except that the width L of each linear electrode 341 was thinned to be 75% of that of Comparative Example 3, i.e., 16.5 μm, and the distance between each linear electrode 341 and an adjacent optical opening 40 was 2.75 μm.

(Evaluation of Liquid Crystal Display Devices of Examples 3 and 4, Comparative Examples 3 and 4, and a Typical In-Cell Liquid Crystal Display Device)

FIG. 38 shows the evaluation results of the front mode efficiency, front contrast ratio, contrast ratio at a 45° polar angle, and contrast ratio viewing angles of each of the liquid crystal display devices of Examples 3 and 4. FIG. 39 shows the evaluation results of the front mode efficiency, front contrast ratio, contrast ratio at a 45° polar angle, and contrast ratio viewing angles of each of the liquid crystal display devices of Comparative Examples 3 and 4 and a typical in-cell liquid crystal display device. Concerning the liquid crystal display devices of Examples 3 and 4, Comparative Examples 3 and 4, and a typical in-cell liquid crystal display device, a simulation was performed for determining the front mode efficiency, front contrast ratio, contrast ratio at a 45° polar angle, and contrast ratio viewing angles as in Example 1. FIG. 38 and FIG. 39 show the results. The touch function of each of the liquid crystal display devices was evaluated as in Example 1 and the like.

The liquid crystal display devices of Examples 3 and 4 were each capable of switching between the wide viewing angle mode and the narrow viewing angle mode, and in the wide viewing angle mode in which the third electrode had a counter voltage Vc of 0 V, a high contrast ratio (surface contrast ratio=1200, contrast ratio at a 45° polar angle=400) was achieved.

Also, as shown in FIG. 38, in Example 3, in the narrow viewing angle mode in which the counter voltage Vc was 6 V, the device successfully had a front contrast ratio of 1159 and a contrast ratio at a 45° polar angle of 40 (similar to Comparative Example 1). Thus, the achieved signal proportion (66%) was higher than the level applicable to finger touch (65%) while the front contrast ratio was increased and the oblique contrast ratio was reduced. Accordingly, Example 3 achieved a highly sensitive in-cell touch function.

In application of a counter voltage Vc of 6 V to each linear electrode 341 of Example 3, which was in contact with the end 40A of an adjacent optical opening 40, a tilted vertical electric field similar to that in Comparative Example 1 was able to act in the optical opening 40. Meanwhile, in the region without electrodes after removing, no tilted vertical electric field was generated. Still, the contrast ratio at a 45° polar angle in the narrow viewing angle mode was able to be made low.

In Example 3, some of the linear electrodes 341 were removed and thus the area occupied by the linear electrodes with respect to the pixels in a front view of the pixels can be reduced. Accordingly, the capacitance between a finger and a corresponding touch panel electrode can be sufficiently ensured, whereby the touch function was presumably able to be improved (signal proportion 66%).

Thus, in Example 3, some of the linear electrodes 341 (counter voltage Vc=6 V) on the counter substrate 30 were removed such that the linear electrodes 341 were spaced with a two-sub-pixel interval while the width L thereof was remained to be D, whereby the device successfully had a front contrast ratio of 1159 and a contrast ratio at a 45° polar angle of 40 (similar to Comparative Example 1), and the achieved signal proportion (66%) was higher than the level applicable to finger touch (65%). Accordingly, Example 3 achieved both of a high contrast ratio and an in-cell touch function.

Also, as shown in FIG. 38, in Example 4, in the narrow viewing angle mode in which the counter voltage Vc was 6 V, the device successfully had a front contrast ratio of 1091 and a contrast ratio at a 45° polar angle of 34 (similar to Comparative Example 1). Thus, the achieved signal proportion was higher than the level applicable to finger touch (65%) while the front contrast ratio was increased and the oblique contrast ratio was reduced. Accordingly, Example 1 achieved a highly sensitive in-cell touch function.

Meanwhile, in Comparative Example 3, in the narrow viewing angle mode in which the counter voltage Vc was 6 V, the device had a front contrast ratio of 1038 and a contrast ratio at a 45° polar angle of 16, and thus achieved an increased front contrast ratio and a reduced oblique contrast ratio in the narrow viewing angle mode. However, Comparative Example 3 failed to achieve a signal proportion equal to or higher than the level applicable to finger touch (65%), resulting in a failure in achieving both of a high contrast ratio and an in-cell touch function.

Also, as shown in Comparative Example 4, when the electrode width of each linear electrode 341 in the counter substrate 30 (counter voltage Vc=6 V) was made to be 75% of the width thereof in Comparative Example 3, the front contrast ratio was 1141 and the contrast ratio at a 45° polar angle was 129, which increased the oblique contrast ratio in the privacy mode (narrow viewing angle mode), unfortunately resulting in reduction of the effect of the privacy mode.

REFERENCE SIGNS LIST

1: gate line
1AA: display region
1CH: contact hole
2: source line
3: thin-film transistor (TFT)
3D: drain electrode
3X: thin-film semiconductor layer
10: active matrix substrate
11: first substrate
12: first electrode
13: first insulating layer
14: second electrode
14a: linear electrode portion
14b: opening
15: second insulating layer
16: third insulating layer
17: fourth insulating layer
18: fifth insulating layer
20: liquid crystal layer
21: liquid crystal molecule
30: counter substrate
31: second substrate
32: color filter
32B: blue color filter
32G: green color filter
32R: red color filter
33: black matrix
34: third electrode
341, 3411, 3412: linear electrode
35: first dielectric layer
36: second dielectric layer
40, 401, 402: optical opening
40A, 341A, 401A, 402A, 3411A, 3412A: end
41: first alignment film
42: second alignment film
61: first polarizer
61A: absorption axis of first polarizer
62: second polarizer
62A: absorption axis of second polarizer 63: positive C plate
64: positive A plate
70: sub-pixel (first sub-pixel)
70B: first blue sub-pixel
70G: first green sub-pixel
70R: first red sub-pixel
71: sub-pixel (second sub-pixel)
71B: second blue sub-pixel
71G: green sub-pixel (second green sub-pixel)
71R: red sub-pixel (second red sub-pixel)
72: display unit
72B: blue display unit
72G: green display unit
72R: red display unit
73: color element
80: island electrode
100: liquid crystal panel
100TE: touch panel electrode
100TP: touch panel line
101: first electrode drive circuit
102: second electrode drive circuit
103: third electrode drive circuit
200: control circuit
201: image signal synthesis circuit
202: display mode selection circuit
203: third electrode application voltage switching circuit
204: database
211: raw image signal
212: image signal
213: display mode switching signal
214: first display mode selection signal
215: second display mode selection signal
216: alternating signal
217: constant voltage signal
218: veil-view display switching signal
219: veil-view pattern image signal
300: backlight
301: light guide plate
302A, 302B: light source
303: LED
304: reflector
305: optical film (3D film)
341, 3411, 3412: linear electrode
1000: liquid crystal display device
DR1: extending direction
L, L14, M, S, S14: width

What is claimed is:

1. A liquid crystal display device comprising:
a liquid crystal panel; and
a control circuit,
the liquid crystal panel including sub-pixels arranged in a matrix pattern in an in-plane direction and sequentially including an active matrix substrate, a liquid crystal layer containing liquid crystal molecules, and a counter substrate,
the active matrix substrate including a first substrate, a gate line, a first electrode, and a second electrode, the first electrode and the second electrode being stacked with an insulating layer in between,
the counter substrate including a second substrate and a third electrode,
each of the sub-pixels being provided with an optical opening allowing light to pass through the liquid crystal panel,
the third electrode not being superimposed with at least a portion of the optical opening in a plan view and including a linear electrode extending along the gate line,
in a direction perpendicular to an extending direction of the gate line, a distance between the linear electrode and the optical opening being less than D/4 and a width of the linear electrode being D/4 or less, wherein a distance between two optical openings adjacent in the direction perpendicular to the extending direction of the gate line is defined as D,
the control circuit being configured to switch between application of alternating voltage and application of constant voltage to the third electrode.

2. The liquid crystal display device according to claim 1, wherein in the third electrode, the linear electrode includes two linear electrodes that satisfy the following formula 1:

$$L \leq S/2 \qquad \text{(formula 1)}$$

wherein L represents a width of each of the linear electrodes and S represents an interval between the two liner electrodes in a direction perpendicular to an extending direction of the gate line.

3. The liquid crystal display device according to claim 1, wherein the liquid crystal display device further includes an island electrode not being electrically connected to the linear electrode in a layer provided with the linear electrode, and
the island electrode is not superimposed with at least a portion of each of the optical openings in a plan view.

4. The liquid crystal display device according to claim 1, wherein the active matrix substrate further includes a touch panel line on a side closer to the liquid crystal layer of the first substrate.

5. The liquid crystal display device according to claim 1, wherein the liquid crystal display device provides a first display mode that allows a first image to be observed in a narrow viewing angle range including a direction normal to the liquid crystal panel, and
a second display mode that allows the first image to be observed in a wide viewing angle range including the narrow viewing angle range, and
the control circuit applies alternating voltage to the third electrode in the first display mode and applies constant voltage, which is common to the first electrode or the second electrode, to the third electrode in the second display mode.

6. The liquid crystal display device according to claim 5, wherein the liquid crystal molecules align in a direction horizontal to the active matrix substrate in a non-voltage application state in which no voltage is applied to the liquid crystal layer,
the liquid crystal molecules in the first display mode align at a different azimuth while forming an angle with the active matrix substrate under an influence of an electric field generated by the first electrode, the second electrode, and the third electrode, and
the liquid crystal molecules in the second display mode align at a different azimuth while aligning parallel to the active matrix substrate under an influence of an electric field generated between the first electrode and the second electrode.

* * * * *